(12) United States Patent
Chen et al.

(10) Patent No.: US 11,099,321 B2
(45) Date of Patent: Aug. 24, 2021

(54) OPTICAL FIBERS FOR SINGLE MODE AND FEW MODE VCSEL-BASED OPTICAL FIBER TRANSMISSION SYSTEMS

(71) Applicant: CORNING INCORPORATED, Corning, NY (US)

(72) Inventors: Xin Chen, Painted Post, NY (US); Ming-Jun Li, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/747,179

(22) Filed: Jan. 20, 2020

(65) Prior Publication Data
US 2020/0257040 A1 Aug. 13, 2020

Related U.S. Application Data

(60) Provisional application No. 62/803,818, filed on Feb. 11, 2019, provisional application No. 62/803,956, filed on Feb. 11, 2019.

(51) Int. Cl.
*G02B 6/028* (2006.01)
*G02B 6/036* (2006.01)
*G02B 6/42* (2006.01)

(52) U.S. Cl.
CPC ......... *G02B 6/0281* (2013.01); *G02B 6/0365* (2013.01); *G02B 6/03627* (2013.01); *G02B 6/42* (2013.01)

(58) Field of Classification Search
CPC . G02B 6/0281; G02B 6/03627; G02B 6/0365
See application file for complete search history.

(56) References Cited

U.S. PATENT DOCUMENTS 6,885,802 B2    4/2005    Oliveti et al.
8,588,569 B2    11/2013    Bookbinder et al.
(Continued)

FOREIGN PATENT DOCUMENTS

CN    105334570 B    10/2018

OTHER PUBLICATIONS

Liu et al; "Multimode and Single-Mode Fiber Compatible Graded-Index Multicore Fiber for High Density Optical Interconnect Application," Opt. Express 26, pp. 11639-11648 (2018).
(Continued)

*Primary Examiner* — Omar R Rojas
(74) *Attorney, Agent, or Firm* — Kevin L. Bray

(57) ABSTRACT

The optical fibers disclosed have single mode and few mode optical transmission for VCSEL-based optical fiber transmission systems. The optical fibers have a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm. The mode-field diameter is in the range from 8.6 microns to 11 microns at 1550 nm or in the range from 8.0 microns to 10.1 microns at 1310 nm. The optical fibers have an overfilled bandwidth OFL BW of at least 1 GHz·km at the at least one wavelength in the second wavelength range. The optical fibers have a gradient-index core and can have a trench refractive index profile. VCSEL based optical transmission systems and methods are disclosed that utilize both single core and multicore versions of the optical fiber.

21 Claims, 20 Drawing Sheets

(56) References Cited

U.S. PATENT DOCUMENTS

| | | |
|---|---|---|
| 8,666,214 B2 | 3/2014 | Bookbinder et al. |
| 8,891,925 B2 | 11/2014 | Bickham et al. |
| 2007/0196061 A1 | 8/2007 | Bickham et al. |
| 2015/0309250 A1* | 10/2015 | Bickham ............ H04B 10/2581 385/124 |
| 2017/0160466 A1 | 6/2017 | Imamura et al. |

OTHER PUBLICATIONS

Kao et al, "Comparison of Single-/Few-/Multi-Mode 850nm VCSELs for Optical OFDM Transmission", vol. 25, No. 14; Optics Express; pp. 16347-16363.

International Search Report and Written Opinion of the International Searching Authority; PCT/US2020/013627; dated Apr. 24, 2020; 12 Pages; European Patent Office.

Larsson et al; "Single-Mode VCSELs, In: Michalzik R (ed) VCSELs: Fundamentals, Technology and Applications of Vertical-Cavity Surface-Emitting Lasers", Springer-Verlag Berlin Heidelberg (2013) 26 Pages.

* cited by examiner

OPTICAL FIBERS FOR SINGLE MODE AND FEW MODE VCSEL-BASED OPTICAL FIBER TRANSMISSION SYSTEMS

This application claims the benefit of priority to U.S. Provisional Application Ser. No. 62/803,956 filed on Feb. 11, 2019 and to U.S. Provisional Application Ser. No. 62/803,818 filed on Feb. 11, 2019, the content of which is relied upon and incorporated herein by reference in its entirety.

FIELD

The present disclosure relates to optical fibers and in particular relates to optical fibers for single mode and few mode VCSEL-based optical fiber transmission systems.

BACKGROUND

Standard single mode (SM) fiber is the preferred optical fiber for use in hyperscale data centers because it has more bandwidth than multimode (MM) fibers, thereby providing higher data rates and longer distance data transmission. On the other hand, hyperscale data centers also utilize relatively short data links, e.g., from 1 meter to 100 meters. In this distance range, MM fiber systems with MM VCSEL transceivers offer lower cost solutions with lower power consumption. In practice, hyperscale data centers use standard SM fiber for both long and short data links to simplify the fiber cable management. In other words, the cost savings and operational benefits associated with using MM fiber for the short data links does not outweigh the additional costs and complexity associated with the fiber cable management issues of dealing with two different types of fiber cables.

The fiber cable management issues can be avoided if low-cost optical transmission can be performed over the SM fiber for the short distance links. VCSELs that emit SM or few mode (FM) light offer the promise of better system performance than MM VCSELs. The SM or FM VCSELs are made using a platform and process similar to that used to form MM VCSELs so that their respective costs are about the same. On the other hand, the lower numerical aperture (NA) and smaller spot size of the light emission from SM and FM VCSELs make them more suitable for launching into smaller core optical fibers, i.e., SM fibers.

In recent years, the design and the technology of making SM VCSELs have reached the level that SM VCSELs can also have similar optical power to MM VCSELs. In addition, a SM VCSEL has a much narrower laser linewidth than a MM VCSEL, e.g., narrower than 0.2 nm, or in some cases narrower than 0.1 nm and in some cases even narrower than 0.07 nm. In contrast, MM VCSELs typically have laser linewidths ranging from 0.3 nm to 0.65 nm, which gives rise to chromatic dispersion effects that limit the bandwidth performance of the system when using MM fiber.

VCSELs for optical fiber data transmission typically operate at 850 nm, but VCSELs can be made to operate within a wavelength range between 850 nm and 1060 nm. In this wavelength range, a standard SM fiber designed for SM operation at wavelengths above 1300 nm can support a few modes. A SM or FM VCSEL can couple to such a fiber with relatively low insertion loss. However, the bandwidth of standard SM fibers within the 850 nm to 1060 nm wavelength range is too low to be suitable for high data rate transmission. To enable the SM or FM VCSEL transmission over a SM fiber, a SM fiber with bandwidth optimized for use in the wavelength range of 850 nm to 1060 nm is needed.

SUMMARY

A SM fiber is disclosed that meets the requirements of the cutoff wavelength $\lambda_C$ and the mode field diameter MFD of standard SM fiber while having optimal bandwidth for SM or FM VCSEL transmission in a wavelength range between 850 nm and 1060 nm. Single-core and multicore embodiments of the SM fiber are disclosed. The SM fibers disclosed herein have dual use, namely they operate as a true SM fiber (i.e., like a standard SM fiber) at wavelengths above 1260 nm while operating as a few-mode fiber at the at least one wavelength in the range of 850 nm to 1100 nm and with a high modal bandwidth. The improved high modal bandwidth is achieved by using a graded index profile in the core region. The single-core and multicore SM fibers disclosed herein enable a cost effective and power efficient transmission for short reach optical fiber links.

The SM fibers disclosed herein are compatible with existing standard SM fiber and can also be used for long-distance transmission. The SM fibers can be made using standard optical fiber drawing techniques and is anticipated to have substantially the same fabrication cost.

An embodiment of the disclosure is an optical fiber for short-length data transmission systems. The fiber comprises: a) a core arranged along a centerline AC and having a gradient relative refractive index defined by an alpha parameter $\alpha$ in a range $2 \leq \alpha \leq 3$ with a maximum relative refractive index $\Delta_{1max}$ in the range $0.3\% \leq \Delta_{1max} \leq 0.5\%$ and a radius $r_1$ in the range $5 \ \mu m \leq r_1 \leq 7 \ \mu m$; b) an inner cladding region immediately surrounding the core and having a relative refractive index $\Delta_2$ in the range $-0.05\% \leq \Delta_2 \leq 0.05\%$ and a radius $r_2$ in the range from $6 \ \mu m \leq r_2 \leq 15 \ \mu m$; c) an intermediate cladding region immediately surrounding the inner cladding region and having a relative refractive index $\Delta_3 \leq \Delta_2$ and in the range $-0.1\% \leq \Delta_3 \leq 0.1\%$ and a radius $r_3$ in the range from $9 \ \mu m \leq r_3 \leq 20 \ \mu m$ and defining a trench volume V in the range $15\% \ \mu m^2 \leq |V| \leq 75\% \ \mu m^2$; d) an outer cladding region immediately surrounding the intermediate cladding region and having a relative refractive index $\Delta_4 \geq \Delta_3$ and in the range $0.0\% \leq \Delta_4 \leq 0.2\%$ and a radius $r_4$ in the range from $40 \ \mu m \leq r_4 \leq 100 \ \mu m$; and i) a cable cutoff wavelength $\lambda_C$ equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from $8.0 \ \mu m \leq MFD \leq 10.1 \ \mu m$ at 1310 nm; and iii) an overfilled bandwidth OFL BW of at least 1 GHz·km at the at least one wavelength in the second wavelength range.

Another embodiment of the disclosure is directed to an optical fiber for short-length data transmission systems. The optical fiber comprises: a) a core arranged along a centerline AC and having a gradient relative refractive index defined by an alpha parameter $\alpha$ in a range $2 \leq \alpha \leq 3$ with a maximum relative refractive index $\Delta_{1max}$ in the range $0.3\% \leq \Delta_{1max} \leq 0.5\%$ and a radius $r_1$ in the range $5 \ \mu m \leq r_1 \leq 10 \ \mu m$; b) an inner cladding region immediately surrounding the core and having a relative refractive index $\Delta_2$ in the range $-0.5\% \leq \Delta_2 \leq 0.0\%$ and a radius $r_2$ in the range from $8 \ \mu m \leq r_2 \leq 25 \ \mu m$; an outer cladding region immediately surrounding the intermediate cladding region and having a relative refractive index $\Delta_4 \geq \Delta_3$ and in the range $0 \leq \Delta_4 \leq 0.2\%$ and a radius $r_4$ in the range from $40 \ \mu m \leq r_4 \leq 100 \ \mu m$; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.0 µm≤MFD≤10.1 µm at 1310 nm; and iii) a overfilled bandwidth OFL BW in the range 1 GHz·km≤OFL BW≤50 GHz·km at the at least one wavelength in the second wavelength range.

Another embodiment of the disclosure is an optical fiber for short-length data transmission systems. The fiber comprises: a) a core arranged along a centerline AC and having a gradient relative refractive index defined by an alpha parameter α in a range 2≤α≤3 with a maximum relative refractive index $\Delta_{1max}$ in the range 0.35%≤$\Delta_{1max}$≤0.45% and a radius $r_1$ in the range 5 µm≤$r_1$≤7 µm; b) a cladding region immediately surrounding the core and having a relative refractive index $\Delta_4$≤$\Delta_1$ and in the range −0.05%≤$\Delta_4$≤0.05% and a radius $r_4$ in the range from 40 µm≤$r_4$≤100 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.0 µm≤MFD≤10.1 µm at 1310 nm; and iii) a overfilled bandwidth OFL BW in the range 1 GHz·km≤OFL BW≤50 GHz·km at the at least one wavelength in the second wavelength range.

Another embodiment of the disclosure is a multicore optical fiber for short-length data transmission systems. The multicore fiber comprises: a cladding matrix; two or more core sections embedded within the cladding matrix, wherein each core section comprises: a) core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 µm≤$r_1$≤7 µm; b) an inner cladding region immediately surrounding the core and having a relative refractive index $\Delta_2$ in the range −0.05%≤$\Delta_2$≤0.05% and a radius $r_2$ in the range from 6 µm≤$r_2$≤15 µm; c) an intermediate cladding region immediately surrounding the inner cladding region and having a relative refractive index $\Delta_3$≤$\Delta_2$ and in the range −0.1%≤$\Delta_3$≤0.1%, and a radius $r_3$ in the range from 9 µm≤$r_3$≤20 µm and defining a trench volume Vin the range 15% µm²≤|V|≤75% µm²; and d) an outer cladding region defined by the cladding matrix and immediately surrounding the intermediate cladding region and having a relative refractive index $\Delta_4$≥$\Delta_3$ and in the range 0.0%≤$\Delta_4$≤0.2%, and a radius $r_4$ in the range from 40 µm≤$r_4$≤100 µm; and i) a cable cutoff wavelength $\lambda_C$ equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.0 µm≤MFD≤10.1 µm at 1310 nm; and iii) an overfilled bandwidth OFL BW of at least 1 GHz·km at the at least one wavelength in the second wavelength range.

Another embodiment of the disclosure is a multicore optical fiber for short-length data transmission systems. The fiber comprises: a cladding matrix; two or more core sections embedded within the cladding matrix, wherein each core section comprises: a) a core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 m≤$r_1$≤10 µm; b) an inner cladding region immediately surrounding the core and having a relative refractive index $\Delta_2$ in the range −0.5%≤$\Delta_2$≤0.0% and a radius $r_2$ in the range from 8 m≤$r_2$≤25 µm; c) an outer cladding region defined by the cladding matrix and immediately surrounding the intermediate cladding region and having a relative refractive index $\Delta_4$≥$\Delta_3$ and in the range 0.0%≤$\Delta_4$≤0.2%, and a radius $r_4$ in the range from 40 µm≤$r_4$≤100 µm; and i) a cable cutoff wavelength $\lambda_C$ equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.0 µm≤MFD≤10.1 µm at 1550 nm; and iii) an overfilled bandwidth OFL BW in the range 1 GHz·km≤OFL BW≤50 GHz·km at the at least one wavelength in the second wavelength range.

Another embodiment of the disclosure is a multicore optical fiber for short-length data transmission systems. The multicore optical fiber comprises: a cladding matrix; two or more core sections embedded within the cladding matrix, wherein each core section comprises: a) a core arranged along a centerline AC and having a gradient relative refractive index defined by an alpha parameter α in a range 2≤α≤3 with a maximum relative refractive index $\Delta_{1max}$ in the range 0.35%≤$\Delta_{1max}$≤0.45% and a radius $r_1$ in the range 5 µm≤$r_1$≤7 µm; b) a cladding region defined by the cladding matrix and immediately surrounding the core and having a relative refractive index $\Delta_4$≤$\Delta_1$ and in the range −0.05%≤$\Delta_4$≤0.05%, and a radius $r_4$ in the range from 40 µm≤$r_4$≤100 µm; and i) a cable cutoff wavelength $\lambda_C$ equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.0 µm≤MFD≤10.1 µm at 1310 nm; and iii) an overfilled bandwidth OFL BW in the range 1 GHz·km≤OFL BW≤50 GHz·km at the at least one wavelength in the second wavelength range.

Another embodiment of the disclosure is directed to an optical fiber data transmission system that comprises: an optical fiber link comprising the at least one of the optical fibers (single core and/or multicore fibers) disclosed herein, wherein the optical fiber link has an input end, an output end and a link length LL between the input and output ends, wherein LL<1000 meters; a transmitter comprising a VCSEL that emits light having a wavelength in the second wavelength range and that carries optical signals at a data rate of at least 10 Gb/s, wherein the VCSEL is optically coupled to the input end of the optical fiber link; and a receiver comprising a photodetector optically coupled to the output end of the optical fiber link and configured to receive the optical signals and convert the optical signals to electrical signals.

Another embodiment of the disclosure is directed to a method of transmitting optical data. The method comprises: a) using a vertical cavity surface-emitting laser (VCSEL) to generating optical data signals at a data rate of at least 10 Gb/s; b) transmitting the optical data signals over an optical fiber link comprising at least one of the optical fibers disclosed herein (e.g., single core and/or multicore); and c) receiving the optical signals at a photodetector configured to convert the optical signals into electrical signals representative of the optical signals.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1:
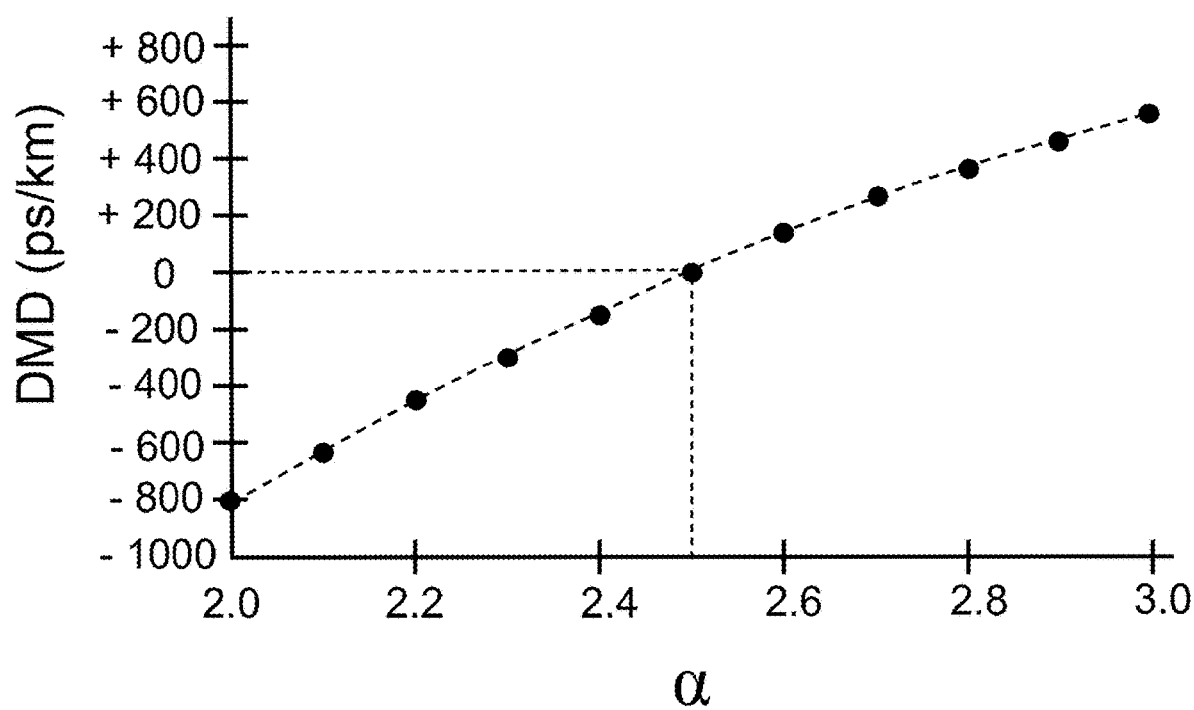
FIG. 1 plots the differential mode delay (DMD), measured in picoseconds per kilometer (ps/km) at a wavelength of 850 nm as a function of the alpha parameter c for an example graded-index SM fiber, illustrating the relationship between the alpha parameter and the DMD.

Reference is made in detail to example embodiments illustrated in the accompanying drawings. Whenever possible, the same reference numerals are used throughout the drawings to refer to the same or like parts.

The claims as set forth below are incorporated into and constitute part of this Detailed Description.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber.

The symbol "μm" is used as shorthand for "micron," which is a micrometer, i.e., $1\times10^{-6}$ meter.

The symbol "nm" is used as shorthand for "nanometer," which is $1\times10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material).

The "relative refractive index" as used herein is defined as:

$$\Delta\% = 100\frac{n^2(r) - n_{cl}^2}{2n^2(r)}$$

where n(r) is the refractive index of the fiber at the radial distance r from the fiber's centreline AC (r=0) at a wavelength of 1550 nm, unless otherwise specified, and $n_{cl}$ is the index of the outer cladding at a wavelength of 1550 nm. When the outer cladding is essentially pure silica, $n_{cl}$=1.444 at a wavelength of 1550 nm. As used herein, the relative refractive index percent (also referred herein as the "relative refractive index" for short) is represented by Δ (or "delta"), Δ% (or "delta %"), or %, all of which can be used interchangeably, and its values are given in units of percent or %, unless otherwise specified. Relative refractive index is also expressed as Δ(r) or Δ(r) %.

In cases where the refractive index of a region is less than the reference index $n_{cl}$, the relative index percent is negative and is referred to as having a depressed region or depressed-index (also referred to as a "trench"), and the minimum relative refractive index is calculated at the point at which the relative index is most negative unless otherwise specified. In cases where the refractive index of a region is greater than the reference index $n_{cl}$, the relative index percent is positive and the region can be said to be raised or to have a positive index.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ. The dopants used to form the core of the optical fiber disclosed herein include $GeO_2$ (germania) and $Al_2O_3$ (alumina). The parameter α (also called the "profile parameter" or "alpha parameter") as used herein relates to the relative refractive Δ(%) where r is the radius (radial coordinate), and which is defined by:

$$\Delta(r)=\Delta_0\{1-[(r-r_m)/(r_0-r_m)]^\alpha\}$$

where $r_m$ is the point where Δ(r) is the maximum $\Delta_0$, $r_0$ is the point at which Δ(r)=0 and r is in the range $r_i$ to $r_f$, where Δ(r) is defined above, $r_i$ is the initial point of the α-profile, $r_f$ is the final point of the α-profile and a is an exponent that is a real number. For a step index relative refractive profile, α>10, and for a gradient relative refractive index profile, α<5.

The "trench volume" is denoted by V and is defined for a trench with a relative refractive index $\Delta_3$ as a constant $\Delta_3$ min:

$$V = \Delta_{3min} \cdot [(r_3)^2 - (r_2)^2].$$

In an example where the relative refractive index $\Delta_3$ varies with radial coordinate (i.e., $\Delta_3(r)$), then the moat or trench volume is given by $$V = 2\int \Delta_3(r) r dr$$

with the limits on the integration being from $r_2$ to $r_3$ and the units are in %-μm². The symbol |V| is used to denote the absolute value of the trench volume.

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[2\frac{\int_0^\infty (f(r))^2 r dr}{\int_0^\infty \left(\frac{df(r)}{dr}\right)^2 r dr}\right]^{1/2}$$

where f(r) is the transverse component of the electric field distribution of the guided optical signal and r is radial position in the fiber. The MFD depends on the wavelength of the optical signal and is reported herein for wavelengths of 850 nm, 980 nm, 1060 nm, 1310 nm, and/or 1550 nm.

The "effective area" of an optical fiber is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. The effective area" or "$A_{eff}$" depends on the wavelength of the optical signal and is understood herein to refer to wavelengths of 1310 nm and 1550 nm unless otherwise noted.

The zero-dispersion wavelength is denoted by $\lambda_0$ and is the wavelength where material dispersion and waveguide dispersion cancel each other. In silica-based optical fibers, the zero-dispersion wavelength is about 1300 nm, e.g., between 1300 and 1320 nm, depending on the dopants used to form the optical fiber.

The operating wavelength is denoted by λ and is a wavelength at which the optical fiber is designed to function. In the discussion below, the fiber 6S has one operating wavelength for SM operation and another operating wavelength for few mode operation, and which operating wavelength is being referred to will be apparent from the discussion. The operating wavelength is also referred to below as just the wavelength unless the context of the discussion requires distinguishing from other wavelengths.

The term "SM" when referring to an optical fiber means that the optical fiber supports a single linear polarized (LP) mode at the (SM) operating wavelength.

The term "few mode" or "few moded" refers to an optical fiber that supports two or three LP modes or mode groups, at the given (few mode) operating wavelength.

The cable cutoff wavelength is denoted $\lambda_C$ and is the minimum wavelength at which the optical fiber will support only one propagating mode. For wavelengths below the cutoff wavelength $\lambda_C$, MM or FM transmission may occur and an additional source of modal dispersion may arise to limit the fiber's information carrying capacity. It is noted that a fiber cutoff wavelength $\lambda_{CF}$ is based on a 2-meter fiber length while the cable cutoff wavelength $\lambda_C$ is based on a 22-meter cabled fiber length. The 22-meter cable cutoff wavelength $\lambda_C$ is typically less than the 2-meter fiber cutoff wavelength $\lambda_{CF}$ due to higher levels of bending and mechanical pressure in the cable environment. Thus, the SM operating wavelength λ has a lower limit of $\lambda_C$. In the discussion below, the cable cutoff wavelength $\lambda_C$ is equal to or below 1260 nm, and further in an example is in the wavelength range from 1160 nm to 1260 nm.

The overfilled bandwidth is denoted OFL BW and measured in units of MHz·km or GHz·km. For the bandwidth measurement, all the propagating modes are excited with comparable weights, which is essentially the overfilled bandwidth.

The effective modal bandwidth (also called the "modal bandwidth") is denoted EMB BW and is also measured in units of MHz·km or GHz·km. The EMB BW is the actual modal bandwidth observed in a link for a specific fiber with a specific source. The EMB BW is defined with the assumptions of the IEEE P802.3ae link model.

The terms "modal bandwidth" or "bandwidth" or just "BW" are used in this application refer to OFL BW unless specified otherwise.

The abbreviation "b-b" stands for "back-to-back."

It is noted that a standard graded-index standard SM fiber can be few moded (i.e., can support two or three mode groups) below the cable cutoff wavelength $\lambda_C$ (e.g., 1300 nm), but as emphasized herein, the OFL BW and the EMB BW bandwidths for few-mode operation are too low for practical use in data center applications.

Properties of Standard SM and MM Optical Fibers

The standard SM optical fiber referred to herein has optical properties according to the G.652 industry standards known in the art and as set forth by Telecommunication Industry Association (TIA). A standard SM optical fiber has a relatively small core of about 9 microns in diameter and a numerical aperture (NA) of about 0.12. A standard single-mode fiber is designed to have a cable cutoff wavelength $\lambda_C$ below (i.e., less than) 1260 nm so the fiber supports only one mode at 1310 nm and supports a few modes at 850 nm. Typically, a standard SM fiber has a step index profile associated with a very high alpha parameter (e.g., $\alpha \geq 10$). The step index profile is simple, but the bandwidth at 850 nm is low. Consequently, a standard single-mode fiber with a step index is not suitable for MM (including few-mode) transmission at 850 nm. An example standard SM optical fiber is Corning® SMF-28®, available from Corning, Inc., Corning, N.Y.

By comparison, a MM fiber has a relatively large core of 50 microns or 62.5 microns in diameter and a numerical aperture (NA) of greater than about 0.2. Standard MM optical fibers are denoted OM1 through OM5 and have select optical properties according to aforementioned industry standards. Due to material dispersion, the maximum achievable EMB bandwidth of such MM fibers is no more than 10-20 GHz·km.

Table 1 below provides a comparison of different MM and SM optical fibers for short reach applications. In Table 1, the overfilled launched bandwidth (OFL BW) and the effective modal bandwidth (EMB BW) are each measured in MHz·km, and the link distance d in the last row stands for "2 to 10 km at 1310 nm." The symbol "N/A" stands for "not applicable." The acronym SMF stands for "SM fiber," while the acronyms OM1 through OM5 represents different industry standard MM fibers. In the table, "*" means that the measurement is for short wavelength division multiplexing (SWDM) using four wavelengths of 850, 880, 910 and 940 nm

TABLE 1

Standard MM and SM fiber properties

| | | | OFL BW | | EMB BW | | Link Distance (m) | | | | | |
|---|---|---|---|---|---|---|---|---|---|---|---|---|
| | | | 850 | 1310 | 850 | 953 | | | | | | |
| Fiber | NA | $r_1$ | nm | nm | nm | nm | 1G | 10G | 40G | 100G | 40G* | 100G* |
| OM1 | 0.28 | 62.5 | 200 | 500 | N/A | N/A | 275 | 33 | N/A | N/A | N/A | N/A |
| OM2 | 0.2 | 50 | 500 | 500 | N/A | N/A | 550 | 82 | N/A | N/A | N/A | N/A |
| OM3 | 0.2 | 50 | 1500 | 500 | 2000 | N/A | N/A | 300 | 100 | 100 | 240 | 75 |
| OM4 | 0.2 | 50 | 3500 | 500 | 4700 | N/A | N/A | 550 | 150 | 150 | 350 | 100 |
| OM5 | 0.2 | 50 | 3500 | 500 | 4700 | 2470 | N/A | 550 | 150 | 150 | 440 | 150 |
| SMF | 0.12 | 9 | N/A | N/A | N/A | N/A | d | d | d | d | N/A | N/A |

Table 1 shows that the link distance for standard MM fibers is between 33 meters to 550 meters depending on the data rate. This is too short to cover hyperscale data centers that have link distances up to a couple of kilometers. On the other hand, the standard SM fiber can provide longer link distances, e.g., between 2 km and 10 km. This is why standard SM fiber is used for hyperscale data centers. While the standard SM fiber is typically few-moded at the shorter wavelengths of interest (e.g., 850 nm to 1100 nm), the OFL modal bandwidth in this wavelength range is too small to be of practical use for short-distance data links currently provided with MM VCSELS and standard MM fiber in this wavelength range. This is a problem because data centers have many short-distance links, e.g., less than a few hundred meters.

Single-Core Optical Fiber for Use with FM and MM VCSELs

FIG. 1 plots the differential mode delay (DMD), measured in picoseconds per kilometer (ps/km) at a wavelength of 850 nm as a function of the alpha parameter c for an example prior art (i.e., standard) graded-index (GRIN) SM fiber. In this example, the maximum core delta is $\Delta_{1max}=0.41\%$, and the core radius is $r_1=5.95$ μm. At 850 nm, the fiber has two mode groups, the $LP_{01}$ and $LP_{11}$. As it can be seen in FIG. 1, the DMD depends on the alpha value. When the alpha value is below 2.5, the DMD is negative, and when the alpha value is above 2.5, the DMD is positive. When alpha is about 2.5, the DMD crosses the zero value, which means that the fiber can have very high bandwidth. Another advantage of having a graded index profile design is that it provides a gradual transition of the relative refractive index Δ from the core to the cladding, which minimizes loss contributions due to core-clad interface imperfections.

Figure 2A:
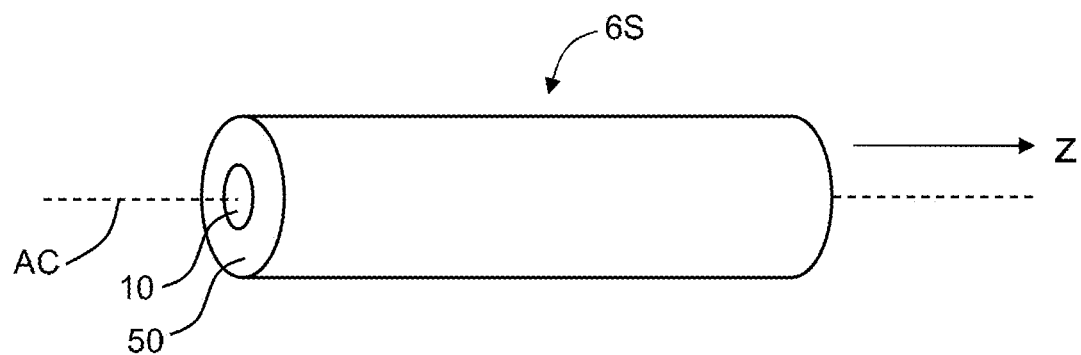
FIG. 2A is a side elevated view of a section of the single-core optical fiber as disclosed herein and having enhanced optical performance for short-distance data communication links that utilize VCSELs.
Figure 2B:
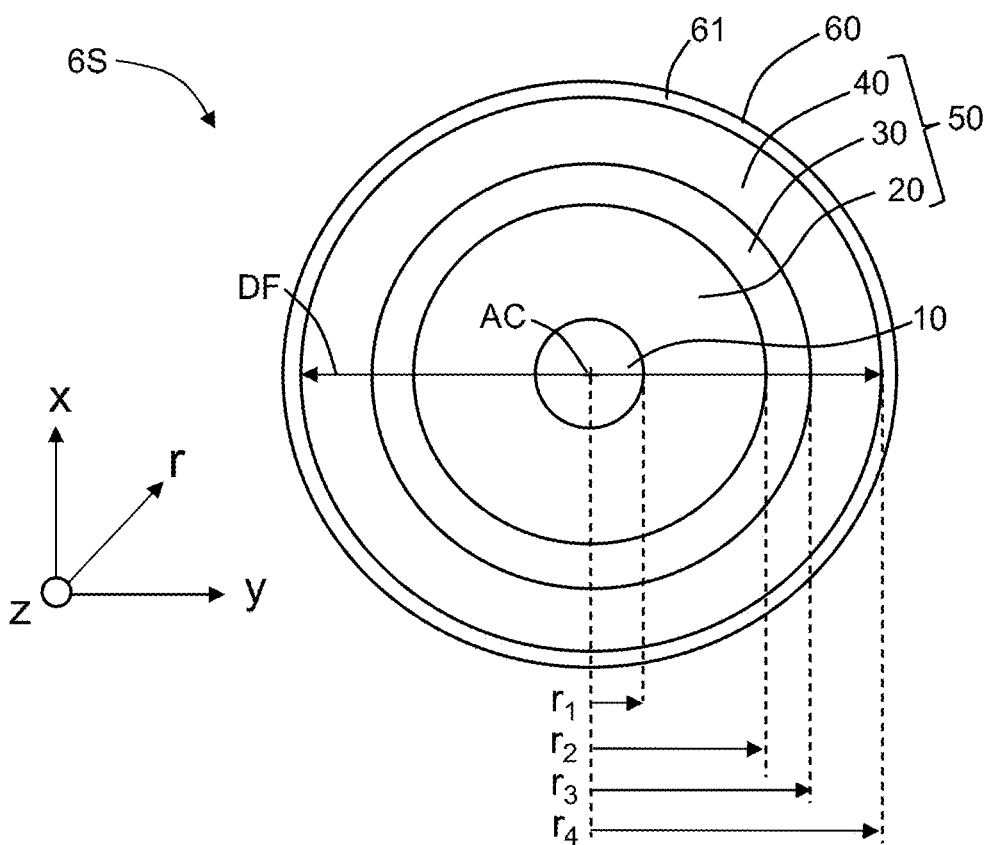
FIG. 2B is a cross-sectional view of the single-core optical fiber of FIG. 1.

FIG. 2A is a schematic elevated view of a section of an example single-core (SC) optical fiber 6S configured to be used effectively with FM and MM VCSELs and formed using the methods disclosed herein. FIG. 2B is an x-y cross-sectional view of the SC fiber 6S.

In the discussion below, the single-core fiber 6S is simply referred to as "fiber" 6S, while the example multicore optical fiber discussed further below is referred to as "multicore fiber" 6M.

The fiber 6S can have a number of different physical configurations set forth below that provide it with desired the optical characteristics for use with FM and MM VCSELs. In an example, the physical configuration of the fiber 6S defines a cable cutoff wavelength $\lambda_C$ below 1260 nm and an MFD in the range from 8.0 µm≤MFD≤10.1 µm or in the range from 8.6 µm≤MFD≤9.5 µm at a wavelength $\lambda$ of 1310 nm, or an MFD in the range from 8.6 µm≤MFD≤11.0 µm or in the range from 9.4 µm≤MFD≤11.0 µm at a wavelength $\lambda$ of 1550 nm. This ensures that the fiber 6S is SM at a wavelength $\lambda$ above 1260 nm and is compatible with the standard SM fiber for splicing and connectorization.

The fiber 6S can also have a zero-dispersion wavelength $\lambda_0$ within the wavelength range from 1300 nm to 1322 nm, which is the same as for a standard SM fiber. However, the dispersion requirement can be relaxed for the fiber 6S for short-link applications, e.g., <2 km. The relaxation of the dispersion requirement allows for the fiber 6S to have a higher NA and a larger core size (radius $r_1$) than that for a standard SM fiber for easy coupling to SM or FM VCSELs and for improved bending performance.

Example Physical Configurations

The fiber 6S can have three main physical configurations, which are defined by way of example as a relative refractive index profile.

Figure 3A:
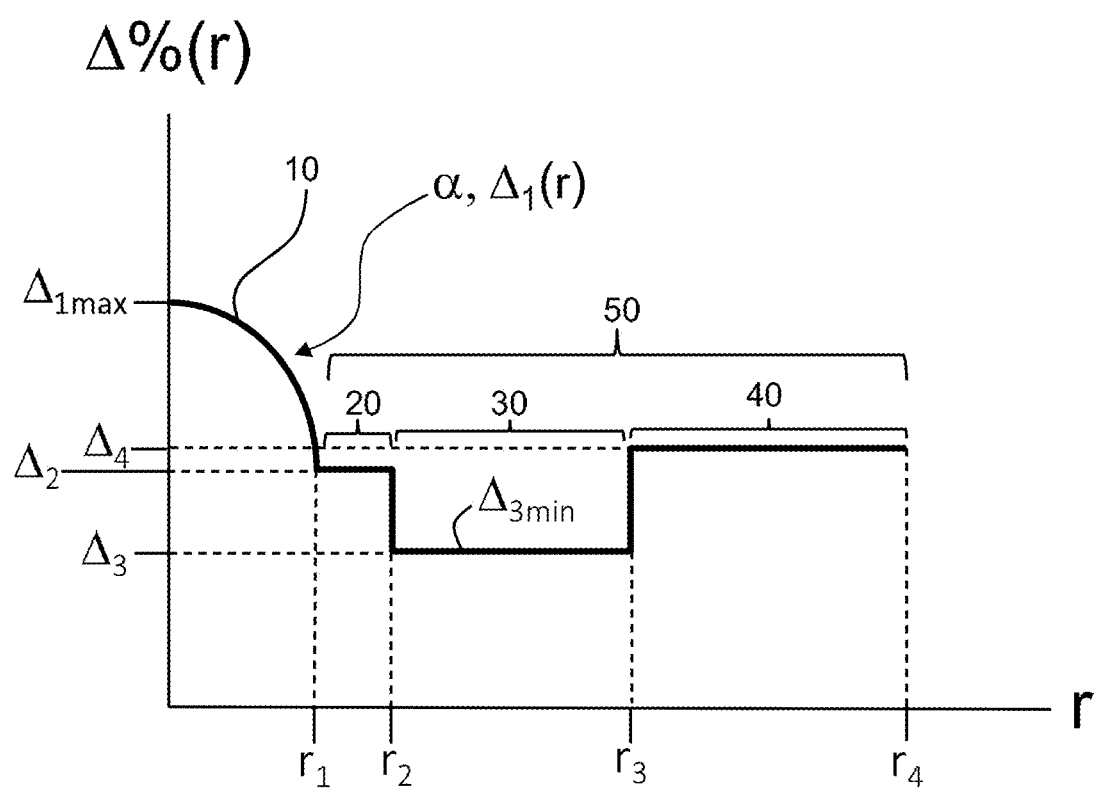
FIGS. 3A through 3C are example relative refractive index profiles of the single-core optical fiber as disclosed herein.

FIG. 3A is a first example physical configuration of the fiber 6S in the form of a plot of the relative refractive index Δ% (r) versus the radial coordinate r. The fiber 6S is SM for wavelengths greater than $\lambda_C$=1260 nm and is configured to have a low bending loss. The SC fiber 6C is also configured to have few modes and have a sufficiently high BW for short-distance data communication links in wavelength range between 800 nm to 1100 nm.

The fiber 6S has a centerline AC shown by way of example as running in the z-direction. The fiber 6S comprises a glass core region ("core") 10 that is centered on the centerline AC and that has a radial extent $r_1$ and a relative refractive index $\Delta_1$, with a maximum value $\Delta_{1max}$ on the centerline AC (i.e., at r=0). The core 10 has a graded index as defined by an alpha value α in the range from 2≤α≤3.

The core 10 is immediately surrounded by a glass cladding region ("cladding") 50 that extends from the core radius $r_1$ out to a cladding outer radius $r_4$. In the example configuration of FIG. 3A, the cladding 50 includes an inner cladding region ("inner cladding") 20 closest to the core and extending from the core radius $r_1$ to a radius $r_2$ and having a relative refractive index $\Delta_2 \leq \Delta_1$; an intermediate cladding region or "trench" 30 immediately adjacent the inner cladding 20 and extending from the radius $r_2$ to a radius $r_3$ and having a relative refractive index $\Delta_3 \leq \Delta_2$; and an outer cladding region ("outer cladding") 40 immediately adjacent the moat 30 and extending from the radius $r_3$ to the outer cladding radius $r_4$ and having a relative refractive index $\Delta_4$, wherein $\Delta_3 \leq \Delta_4$.

To achieve high bandwidth at 850 nm for the refractive index profile shown in FIG. 3A, the core 10 is preferably to have graded index profile with an alpha value between 2 to 3. The core 10 has a maximum relative refractive index change $\Delta_{1max}$ is between 0.3 and 0.5%, and core radius $r_1$ between 5 and 7 µm. The inner cladding 20 has a relative refractive index change $\Delta_2$ between −0.05% and 0.05%, and a radius $r_2$ between 6 µm and 15 µm. The trench 30 has a relative refractive index $\Delta_3$ between −0.6% and −0.1%, and a radius $r_3$ between 9 µm and 20 µm. The trench volume |V| is between 15% µm² and 75% µm². The outer cladding 40 has a relative refractive index $\Delta_4$ between 0.0% and 0.2%, and radius of $r_4$ extends to the end of fiber cladding.

Typically, $r_4$ is 62.5 µm for standard optical fiber. Other cladding radius $r_4$ can be used, for example, 40 µm, 75 µm, and 100 µm. Proper combination of the fiber parameters in the ranges described above can result optical fiber properties that meet standard SM fiber requirements for 1310 nm or 1550 nm SM transmission and bandwidth requirements for 850 nm few mode transmission. In addition, the core diameter of the disclosed fiber is greater than 11 µm, and the NA is greater than 0.11, which are suitable for coupling SM VCSELs to the fiber.

In an example, the example fiber 6S of FIG. 2B includes a protective coating 60 made of a non-glass material 61, such as a polymeric material.

Figure 3B:
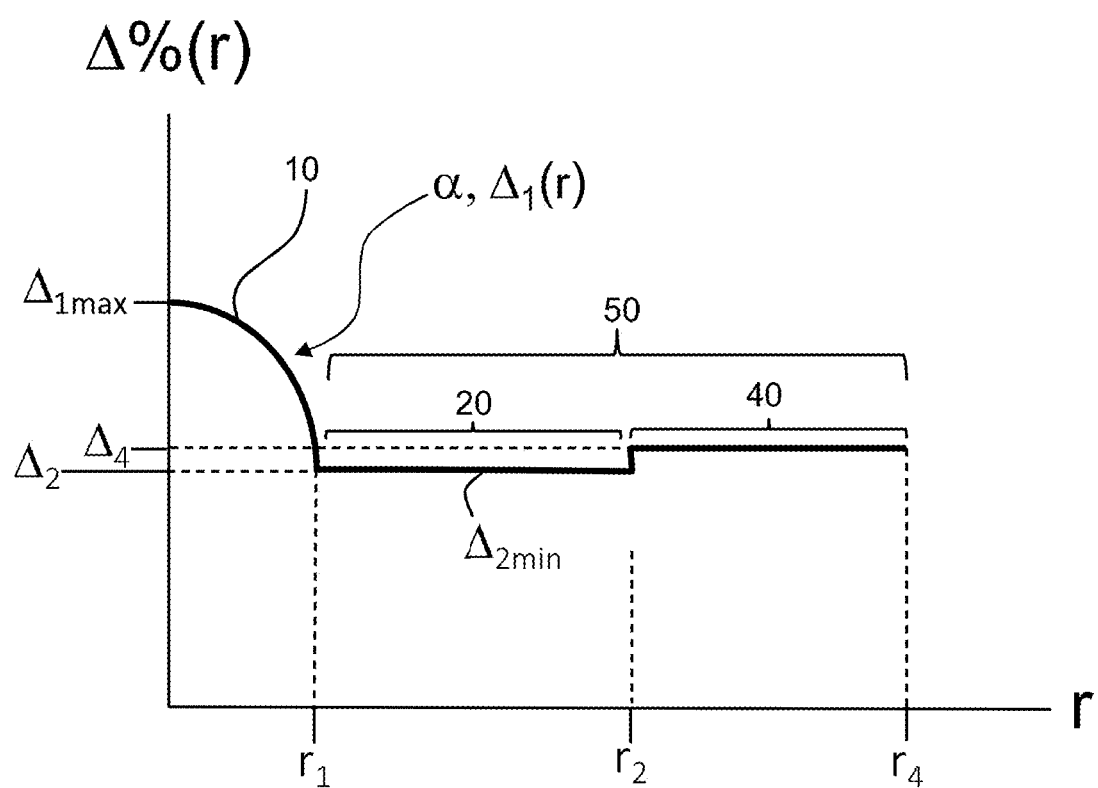

FIG. 3B is another plot of the relative refractive index Δ% (r) versus the radial coordinate illustrating a second example physical configuration of the fiber 6S. The fiber 6S is SM for wavelengths greater than $\lambda_C$=1260 nm. The fiber 6S is also configured to have few modes and have a sufficiently high BW for short-distance data communication links at wavelength range between 800 nm to 1100 nm. The core 10 has a graded index as defined by an alpha value α in the range from 2≤α≤3, and a relative refractive index $\Delta_1$. The core 10 is immediately surrounded by a glass cladding region ("cladding") 50 that extends from the core radius $r_1$ out to a cladding outer radius $r_4$. The cladding 50 includes an inner cladding region ("inner cladding") 20 closest to the core and extending from the core radius $r_1$ to a radius $r_2$ and having a relative refractive index $\Delta_2 \leq \Delta_1$; and an outer cladding region ("outer cladding") 40 immediately adjacent the inner cladding 20 and extending from the radius $r_2$ to the outer cladding radius $r_4$ and having a relative refractive index $\Delta_4$, wherein $\Delta_2 \leq \Delta_4$. In an example, $\Delta_2 = \Delta_{2min}$=constant.

To achieve high bandwidth at 850 nm for the refractive index profile shown in FIG. 3B, the core 10 is preferably to have graded index profile with an alpha value between 2 to 3. The core 10 has a maximum relative refractive index $\Delta_{1max}$ between 0.3% and 0.5%, and core radius $r_1$ between 5 µm and 10 µm. The inner cladding 20 has a relative refractive index change $\Delta_2$ between −0.5% and 0.05%, and a radius $r_2$ between 8 µm and 25 µm. The outer cladding 40 has a relative refractive index $\Delta_4$ between 0.0% and 0.2%, and radius of $r_4$ extends to the end of fiber cladding. Typically, $r_4$ is 62.5 µm for standard optical fiber. Other cladding radius $r_4$ can be used, for example, 40 µm, 75 µm, and 100 µm. Proper combination of the fiber parameters in the ranges described above can result optical fiber properties that meet standard SM fiber requirements for 1310 nm or 1550 nm SM transmission and bandwidth requirements for 850 nm few mode transmission. In addition, the core diameter of the disclosed fiber is greater than 11 µm, and the NA is greater than 0.11, which are suitable for coupling SM VCSELs to the fiber.

In an example, the example fiber 6S of FIG. 3B includes a protective coating 60 made of a non-glass material 61, such as a polymeric material.

Figure 3C:
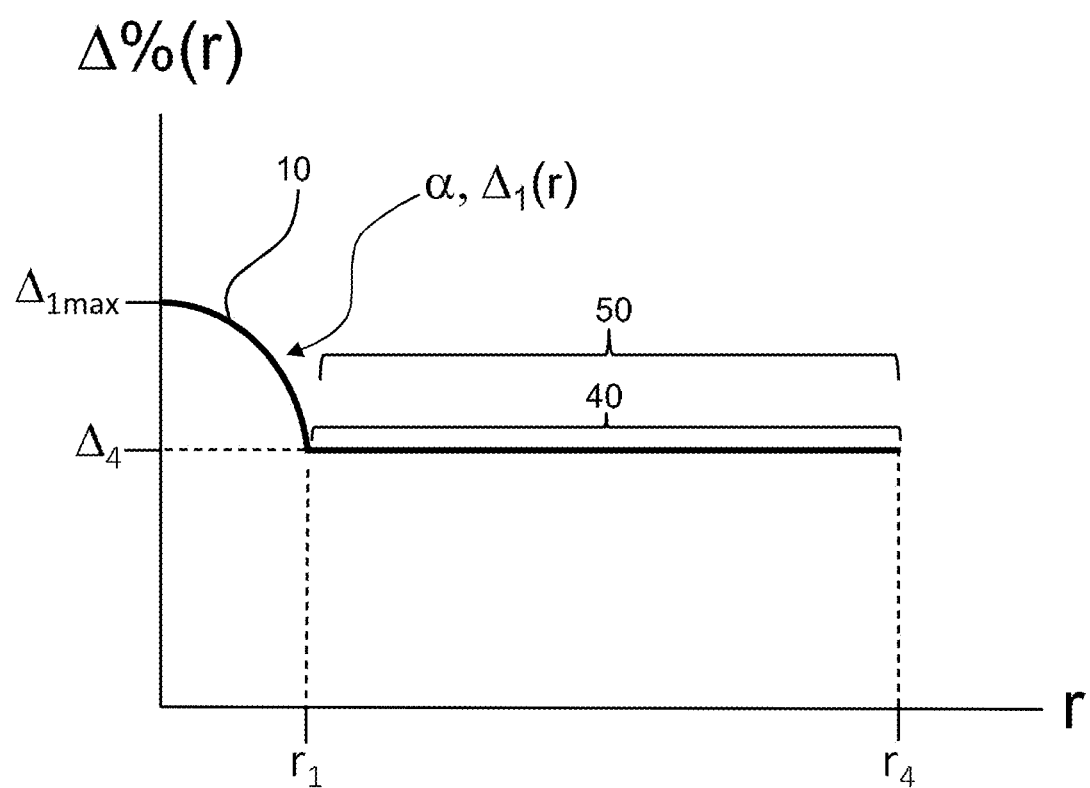

FIG. 3C is another plot of the relative refractive index Δ% (r) versus the radial coordinate r for another example physical configuration of the fiber 6S. The fiber 6S is SM for wavelengths greater than $\lambda_C$=1260 nm. The fiber 6S is also configured to have few modes and have a sufficiently high BW for short-distance data communication links at the at least one wavelength in wavelength range between 800 nm to 1100 nm.

The core 10 has a graded index as defined by an alpha value α in the range from 2≤α≤3, and a relative refractive index $\Delta_1$. The core 10 is immediately surrounded by glass cladding region ("cladding") 50 that includes just the single cladding region 40, which extends from the core radius $r_1$ out to a cladding outer radius $r_4$ and having a relative refractive index $\Delta_4$, wherein $\Delta_4 \leq \Delta_1$.

To achieve high bandwidth at 850 nm for the refractive index profile shown in FIG. 3C, the core 10 is preferably to have graded index profile with an alpha value between 2 to 3. The core 10 has a maximum relative refractive index $\Delta_{1max}$ between 0.35% and 0.45%, and core radius $r_1$ between 5 μm and 7 μm. The cladding 50 has a relative refractive index $\Delta_4$ that is substantially zero, such as between −0.05% and 0.05% or between −0.02% and 0.02%, and radius of $r_4$ extends to the end of fiber cladding. Typically, $r_4$ is 62.5 μm for standard optical fiber. Other cladding radius $r_4$ can be used, for example, 40 μm, 75 μm, and 100 μm. Proper combination of the fiber parameters in the ranges described above can result optical fiber properties that meet standard SM fiber requirements for 1310 nm or 1550 nm SM transmission and bandwidth requirements for 850 nm few mode transmission. In addition, the core diameter of the disclosed fiber is greater than 11 μm, and the NA is greater than 0.11, which are suitable for coupling SM VCSELs to the fiber.

In an example, the example fibers 6S include a protective coating 60 made of a non-glass material 61, such as a polymeric material (see FIG. 2B).

Design Examples

Ten design examples EX1 through EX10 of the fiber 6S are set forth in Tables 2A and Table 2B, below, with examples EX1 through EX5 set forth Table 2A and examples EX6 through EX10 set forth in Table 2B.

Example EX 1 has a refractive index profile according to FIG. 3C, which has a core 10 and cladding 50.

Examples EX 2 to EX 6 have a refractive index profile according FIG. 3B, which has a core 10 and a cladding 50 comprising an inner cladding 20, and an outer cladding 40. In these examples, the inner cladding 20 is pure silica with a relative refractive index $\Delta_2=0$. The outer cladding 40 is up-doped relative to the inner cladding 20.

Examples EX 9 and EX 10 have a refractive index profile according FIG. 3B, which has a core 10 and a cladding 50 comprising an inner cladding 20, and an outer cladding 40. In these examples, the inner cladding 20 is down-doped with a relative refractive index $\Delta_2<0$. The outer cladding 40 is pure silica with a relative index $\Delta_4=0$.

Examples EX 7 and EX 8 have a refractive index profile according FIG. 3A, which has a core 10 and a cladding 50 comprising an inner cladding 20, a trench 30 and an outer cladding 40. In these examples, the inner cladding 20 is pure silica with a relative refractive index $\Delta_2=0$. The trench is down-doped with a relative refractive index $\Delta_3<0$. The outer cladding is pure silica with a relative refractive index $\Delta_4=0$.

TABLE 2A

| Parameter | EX 1 | EX 2 | EX 3 | EX 4 | EX 5 |
|---|---|---|---|---|---|
| $\Delta_{1max}$ (%) | 0.41 | 0.41 | 0.435 | 0.42 | 0.48 |
| α | 2.59 | 2.52 | 2.335 | 2.46 | 2.22 |
| $r_1$ (μm) | 5.72 | 5.95 | 6.35 | 6.05 | 6.91 |
| $\Delta_2$ (%) | N/A | 0 | 0 | 0 | 0 |
| $r_2$ (μm) | N/A | 10 | 12 | 25 | 21 |
| $\Delta_3$ (%) | N/A | N/A | N/A | N/A | N/A |
| $r_3$ (μm) | N/A | N/A | N/A | N/A | N/A |
| $\Delta_4$ (%) | 0.0 | 0.03 | 0.03 | 0.04 | 0.15 |
| $r_4$ (μm) | 62.5 | 62.5 | 62.5 | 62.5 | 62.5 |
| $\lambda_C$ (nm) | 1257 | 1232 | 1208 | 1223 | 1209 |
| MFD at 1310 nm (μm) | 9.14 | 9.32 | 9.2 | 9.2 | 9.2 |
| Effective area at 1310 nm (μm²) | 64.27 | 66.7 | 65.2 | 65.5 | 65.7 |
| Dispersion at 1310 nm (ps/nm · km) | 0.0324 | −0.142 | 0.4 | 0.3 | 0.9 |
| Dispersion slope at 1310 nm (ps/nm² · km) | 0.089 | 0.0891 | 0.0906 | 0.0900 | 0.0924 |
| MFD at 1550 nm (μm) | 10.347 | 10.592 | 10.4 | 10.4 | 10.3 |
| Effective area at 1550 nm (μm²) | 80.91 | 84.55 | 81.3 | 81.8 | 80.5 |
| Dispersion at 1550 nm (ps/nm · km) | 17.29 | 17.16 | 17.9 | 17.8 | 18.9 |
| Dispersion slope at 1550 nm (ps/nm² · km) | 0.0596 | 0.06 | 0.0606 | 0.0604 | 0.0623 |
| 850 nm Overfill bandwidth (GHz · km) | >40 | >100 | >10 | >10 | >10 |

TABLE 2B

| Parameter | EX 6 | EX 7 | EX 8 | EX 9 | EX 10 |
|---|---|---|---|---|---|
| $\Delta_{1max}$ (%) | 0.44 | 0.36 | 0.36 | 0.33 | 0.33 |
| α | 2.34 | 2.98 | 2.98 | 2.12 | 2.39 |
| $r_1$ (μm) | 6.44 | 5.5 | 5.5 | 8.9 | 6.3 |
| $\Delta_2$ (%) | 0 | 0 | 0 | −0.4 | −0.1 |
| $r_2$ (μm) | 23.5 | 7.4 | 12 | 12.9 | 15 |
| $\Delta_3$ (%) | N/A | −0.3 | −0.3 | N/A | N/A |
| $r_3$ (μm) | N/A | 12 | 15 | N/A | N/A |
| $\Delta_4$ (%) | 0.1 | 0 | 0 | 0 | 0 |
| $r_4$ (μm) | 62.5 | 62.5 | 62.5 | 62.5 | 62.5 |
| $\lambda_C$ (nm) | 1193 | 1248 | 1241 | 1238 | 1220 |
| MFD at 1310 nm (μm) | 9.2 | 9.0 | 9.6 | 9.3 | 9.2 |
| Effective area at 1310 nm (μm²) | 65.2 | 63.6 | 67.1 | 68.3 | 65.4 |
| Dispersion at 1310 nm (ps/nm · km) | 0.4 | 2.1 | 0.04 | 2.7 | 0.6 |
| Dispersion slope at 1310 nm (ps/nm² · km) | 0.0910 | 0.0931 | 0.0896 | 0.0942 | 0.0898 |
| MFD at 1550 nm (μm) | 10.4 | 9.9 | 10.6 | 10.2 | 10.4 |
| Effective area at 1550 nm (μm²) | 81.3 | 76.1 | 84.6 | 81.0 | 81.8 |
| Dispersion at 1550 nm (ps/nm · km) | 18.1 | 20.3 | 17.7 | 21.2 | 18.0 |
| Dispersion slope at 1550 nm (ps/nm² · km) | 0.0613 | 0.0631 | 0.0626 | 0.0646 | 0.0598 |
| 850 nm Overfill bandwidth (GHz · km) | >10 | >10 | >10 | >10 | >10 |

All the example fibers 6S set forth in Table 2A and 2B are compliant/compatible with standard SM fiber performance with respect to the mode field diameter MFD and the cable cutoff wavelength $\lambda_C$. The examples EX1 through EX4, EX6, EX8, and EX10 are also compliant/compatible with the chromatic dispersion requirements of a standard SM fiber. The examples EX5, EX7 and EX9 have slightly higher dispersion than a conventional SM fiber, but it the amount of dispersion is small enough for short distance data links of the type used in data center applications.

The examples EX1 through EX10 of the fiber 6S are specifically designed to have optimal performance at a wavelength $\lambda$ of 850 nm. Specifically, the optimal alpha values are identified for each of the examples EX1 through EX10 so that the overfill bandwidth OFL BW of the fiber at 850 nm is above 10 GHz·km.

Even with anticipated profile imperfections associated with manufactured fibers 6S using the fiber draw process described below, the bandwidth is greater than 1 GHz·km. In an example, the bandwidth is greater than 2 GHz·km. In another example, the bandwidth is greater than 5 GHz·km.

Example Multicore Fibers

An aspect of the disclosure is directed to multicore fibers based on the use of the graded-index cores 10 disclosed herein that are SM at wavelengths around 1310 nm and around 1550 nm or above 1260 nm, but that are also few mode at wavelength around 850 nm, or from 840 nm to 1100 nm and at the at least one wavelength have a modal bandwidth above 500 MHz·km or above 1 GHz·km or above 2 GHz·km or even 5 GHz·km, which as noted above is optimized or suitable for SM or FM VCSEL transmission.

Figure 4:
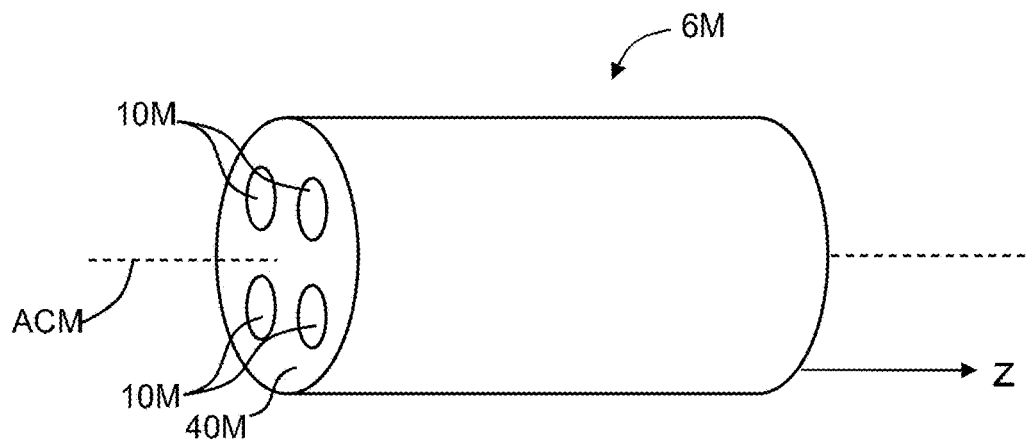
FIG. 4 is a side elevated view of a section of an example multicore optical fiber as disclosed herein and having enhanced optical performance for short-distance data communication links that utilize VCSELs.

FIG. 4 is similar to FIG. 2A and is a side elevated view of a section of an example multicore fiber 6M as disclosed herein. FIGS. 5A through 5D are cross-sectional views of example configurations for a multicore fiber 6M of FIG. 4. The multicore fiber 6M generally comprises a central axis ACM and two or more core structures 10M embedded in an outer cladding matrix 40M, which in an example can be the same material as the outer cladding 40 of the single core fiber 6S disclosed above. Each core structure 10M includes at least the core 10, the inner cladding region 20 and the intermediate cladding or trench region 30 as described above in connection with the single core fiber 6S. The outer cladding matrix 40M serves as a common outer cladding for each of the core structures 10M. The multicore fiber 6M is essentially a collection of single core fibers 6S that have a common outer cladding 40. The multicore fibers 6M disclosed herein can also include the non-glass protective coating 60 on the outside of the cladding matrix 40M (see FIG. 6B, introduced and discussed below).

Each core structure 10M supports a SM at a wavelength $\lambda$ in the range from about 1310 nm to 1550 nm or above 1260 nm. The core structure 10 supports a few (i.e., two or three) modes at a wavelength $\lambda$ of 850 nm.

The core structures 10M can comprise those set forth in the examples EX1 through EX10 listed in Table 1. In an example, the two or more core structures 10M in a given multicore fiber 6M need not be the same.

Each multicore structure 10M of the multicore fiber 6M supports a modal bandwidth value of greater than 500 MHz·km, or greater than 1000 MHz·km or even greater than 2000 MHz·km at a wavelength of 850 nm. The modal bandwidth value can be at a wavelength between 840 nm and 1100 nm.

Figure 5A:
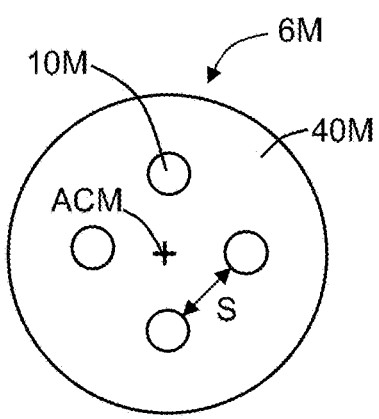
FIGS. 5A through 5D are cross-sectional views of example configurations of the multicore optical fiber of FIG. 4.
Figure 5B:
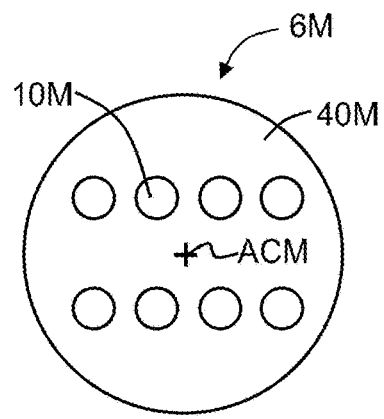
Figure 5C:
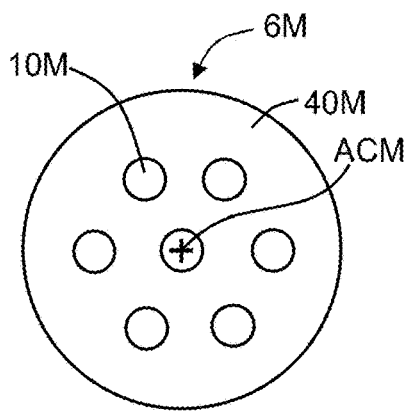
Figure 5D:
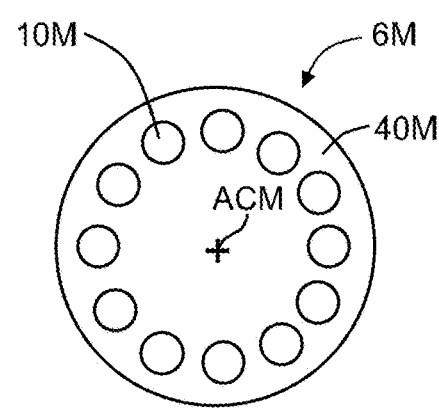

The example multicore fiber 6M of FIG. 5A has four core structures 10M in a square arrangement about the central axis ACM. The multicore fiber 6M of FIG. 5B has eight core structures 10M in a 2×4 linear arrangement (i.e., two rows of four core structures 10M). The multicore fiber 6M of FIG. 5C has seven core structures 10M, with six of the core structures arranged in a hexagonal configuration and the seventh core structure arranged on the central axis ACM. The multicore fiber 6M of FIG. 5D has twelve core structures 10M arranged in a ring around the central axis ACM. Other configurations and numbers of the two or more core structures 10M can also be effectively employed.

In an example, the minimum core spacing S (see FIG. 5A) is in the range between 20 μm and 45 μm to avoid crosstalk between neighboring core structures 10M. Preferably the amount of crosstalk is less than −30 dB/km, more preferably less than −35 dB/km, and even more preferably less than −40 dB/km. The crosstalk depends on core design and distance between the two adjacent core structures 10M. Thus, for a given core structure design, the spacing S is chosen such that the cross-talk is at least less than −30 dB/km, more preferably less than −35 dB/km and most preferably less than −40 dB/km.

Fabricating the Optical Fibers

Figure 6A:
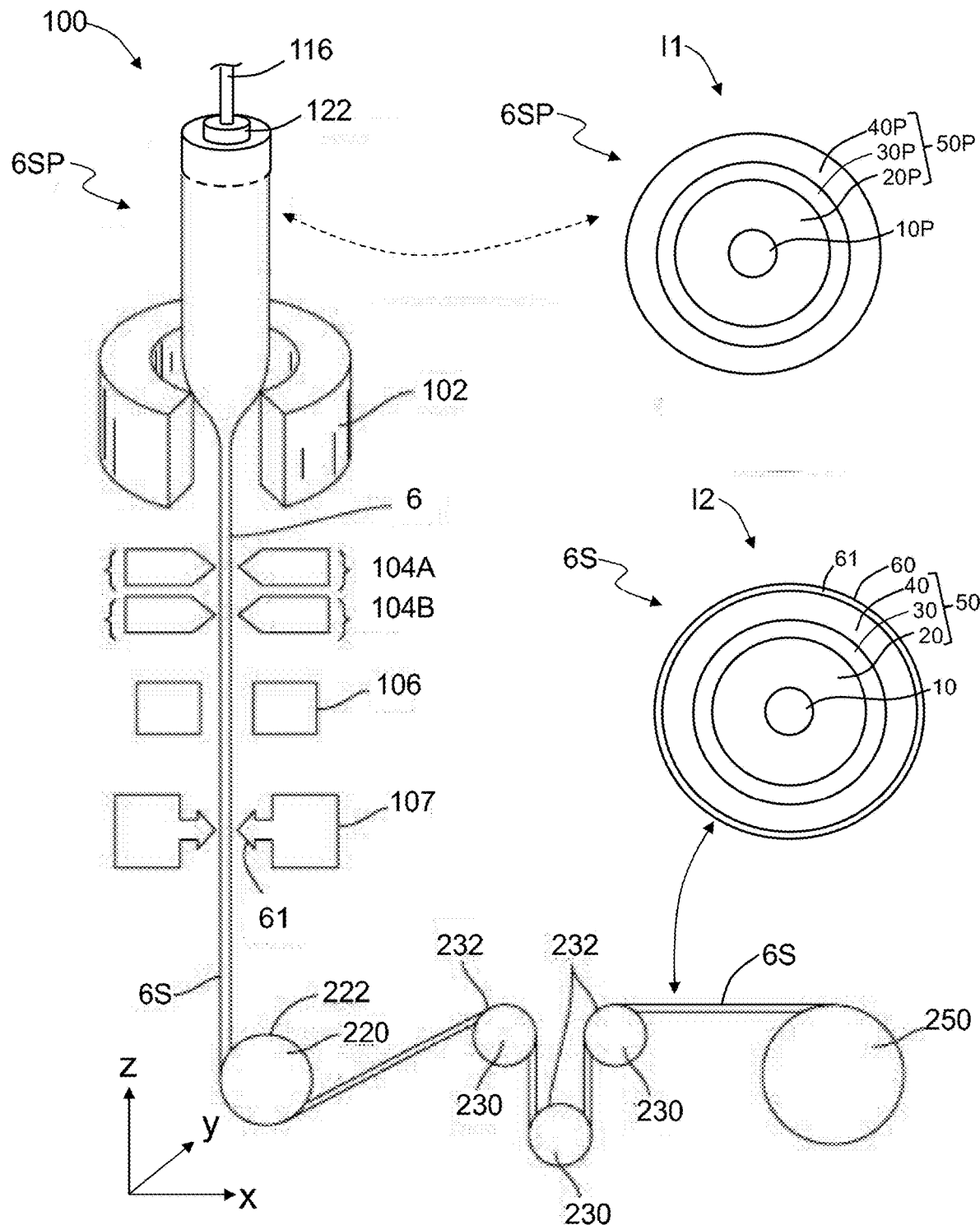
FIG. 6A is a schematic diagram of an example optical fiber drawing system illustrating the fabrication of single-core optical fiber as disclosed herein.
Figure 6B:
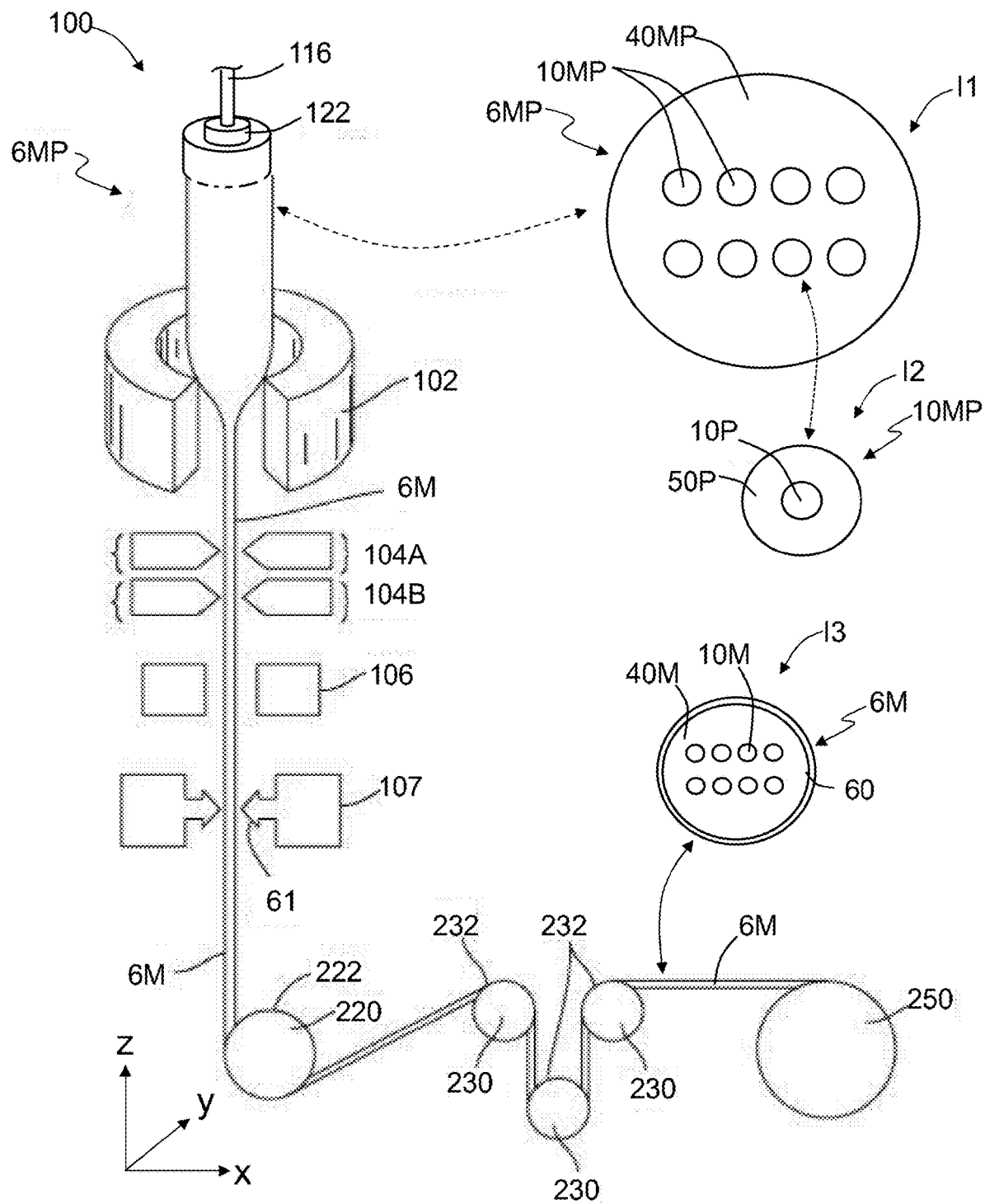
FIG. 6B is a schematic diagram of the optical fiber drawing system of FIG. 6A illustrating the fabrication of the multicore optical fiber as disclosed herein.

FIGS. 6A and 6B are schematic diagrams of an example optical fiber drawing system ("drawing system") 100 for drawing a single-core glass preform 6SP into the single core fiber 6S (FIG. 4A) or for drawing a multicore glass preform 6MP into the multicore fiber 6M (FIG. 4B). The single core fiber 6S or the multicore fiber 6M can be fabricated using the drawing system 100 and fiber drawing techniques known in the art.

With reference to FIGS. 6A and 6B, the example drawing system 100 includes a draw furnace ("furnace") 102 for heating the preform 6SP or 6MP to the glass melt temperature. In an example, the fiber draw process is carried out a glass melt temperature, which in an example is in the range from 1800° C. to 1900° C. A preform holder 116 is used to hold the preform 6SP or 6MP.

The drawing system 100 also includes non-contact measurement sensors 104A and 104B for measuring the size of a drawn (bare) fiber 6S or 6M that exits the draw furnace 102 for size (diameter) control. A cooling station 106 resides downstream of the measurement sensors 104A and 104B and is configured to cool the bare single-core fiber 6S or bare multicore fiber 6M. A coating station 107 resides downstream of the cooling station 106 and is configured to deposit a protective coating material 61 onto the bare fiber 6S or 6M to form the protective coating 60. A tensioner 220 resides downstream of the coating station 107. The tensioner 220 has a surface 222 that pulls (draws) the coated single-core fiber 6S or multicore fiber 6M. A set of guide wheels 230 with respective surfaces 232 resides downstream of the tensioner 220. The guide wheels 230 serve to guide the coated single-core fiber 6S or the coated multicore fiber 6M, to a fiber take-up spool ("spool") 250 for storage.

The close-up inset I1 of FIG. 6A shows a cross-sectional view of the single-core preform 6SP used to fabricate the single-core fiber 6S. The single core preform 6SP includes a preform core 10P, a preform inner cladding region 20P, a preform intermediate cladding region or preform trench 30P and a preform outer cladding 40P. The preform inner cladding region 20P, the preform trench 30P and the preform outer cladding region 40P constitute a preform cladding 50P. The preform 6SP can be fabricated using known techniques, such as an outside vapor deposition (OVD) process.

The close-up inset I2 shows a cross-sectional view of the coated single-core fiber 6S. In an example, the protective coating material 61 comprises a non-glass material, such as a polymer or acrylate.

FIG. 6B is similar to FIG. 6A except that a multicore fiber preform 6MP is employed to form the multicore fiber 6M. The inset I1 shows a cross-sectional view of an example of the multicore fiber preform 6MP, which comprises multiple multicore preform core structures 10PM within a preform outer cladding matrix 40MP. The close-up inset 12 shows a close-up cross-sectional view of an example preform core structure 10PM having made up of a central preform core 10P and a preform outer cladding similar 50P, such shown in the close-up inset I1 of FIG. 6A. The close-up inset 13 shows the resulting multicore fiber 10M, which in the example shown includes the non-glass protective coating 60. The multicore fiber preform 6MP can be fabricated using techniques known in the art, such as the aforementioned OVD process or an all-glass process that utilizes a bulk cladding glass with one or more precision-formed axial holes sized to accommodate respective one or more canes that define the preform core structures.

Standard SM Fiber Bandwidth Characterization

Figure 7A:
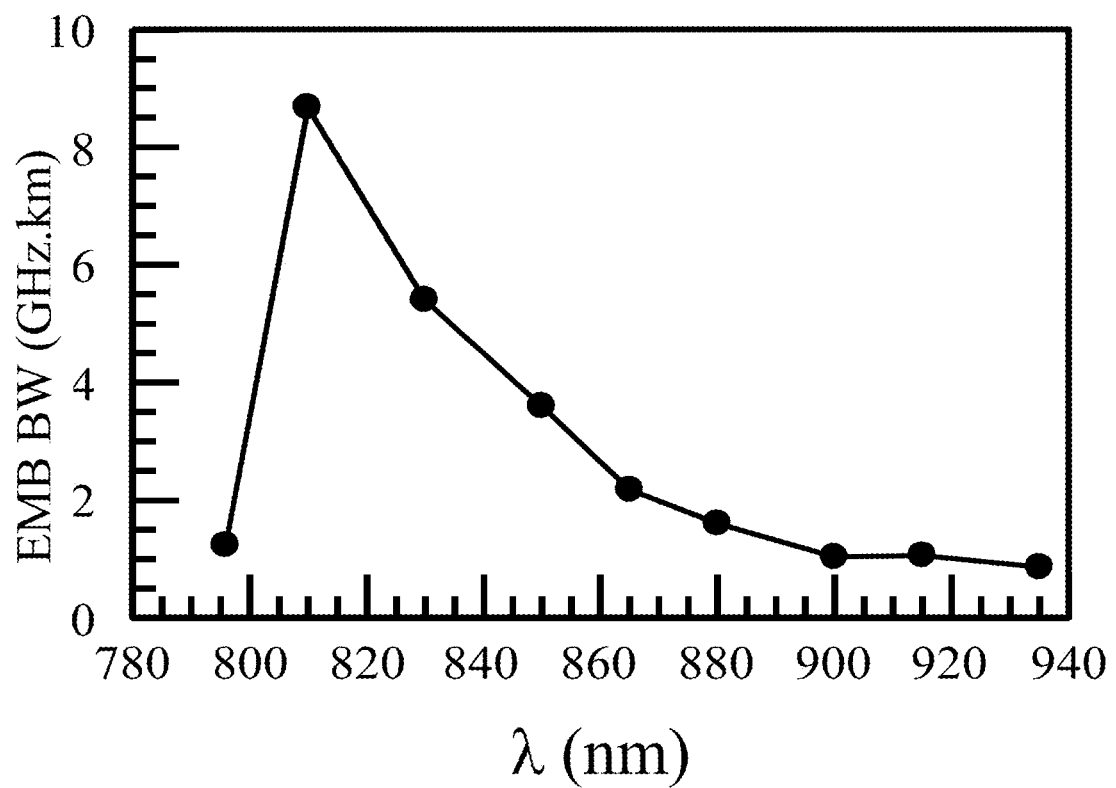
FIG. 7A is a plot of the characterized effective modal bandwidth EMB BW (GHz·km) versus λ (nm) wavelength of a standard SM fiber.

Experiments were conducted to characterize the modal bandwidth of a standard SM graded-index SM fiber in the form of Corning® SMF-28® Ultra fiber. FIG. 7A is a plot of the characterized OFL BW (GHz·km) versus $\lambda$ (nm) wavelength of an example of such a fiber. The peak effective modal bandwidth is at least 9 GHz·km at a wavelength around 820 nm. Although the peak bandwidth is not at 850 nm, the modal bandwidth is 3.6 GHz·km at 850 nm, which is sufficiently high for optical transmission using SM VCSELs.

In addition, the OFL BW at 850 nm for six examples of graded index fibers 6S according to the design of FIG. 3B was measured and the results are set forth in Table 3 below. The modal bandwidth was measured using a frequency domain method when two modes were nearly equally excited. In all the six examples, the core delta $\Delta_1$ is about 0.44%, core radius $r_1$ is about 6.45 µm, the inner clad delta $\Delta_2$ is about zero, the radius $r_2$ is about 12.5 µm, and the outer clad is updoped with a delta $\Delta_4$ of about 0.03%. The differences in bandwidth are mainly due to alpha value differences as shown in Table 3.

TABLE 3

OFL BW for six example graded-index fibers 6S

| Fiber | alpha | OFL BW (GHz · km) |
|---|---|---|
| Fiber 1 | 2.493 | 48.3 |
| Fiber 2 | 2.432 | 2.08 |
| Fiber 3 | 2.370 | 1.03 |
| Fiber 4 | 2.531 | 3.93 |
| Fiber 5 | 2.582 | 1.64 |
| Fiber 6 | 2.505 | 14.3 |

The measured OFL BW values range from about 1 GHz·km (Fiber 3) to 48 GHz·km (Fiber 1). Note that by comparison the OFL BW of standard OM4 fiber is 3.5 GHz·km at 850 nm. Fiber 1, Fiber 4 and Fiber 6 have an OFL BW well above the OM4 OFL BW threshold. For comparison, the measured OFL BW of a step-index SM fiber was measured to be 0.18 GHz·km, which is much lower than the graded-index profile single mode fibers in Table 3.

Figure 7B:
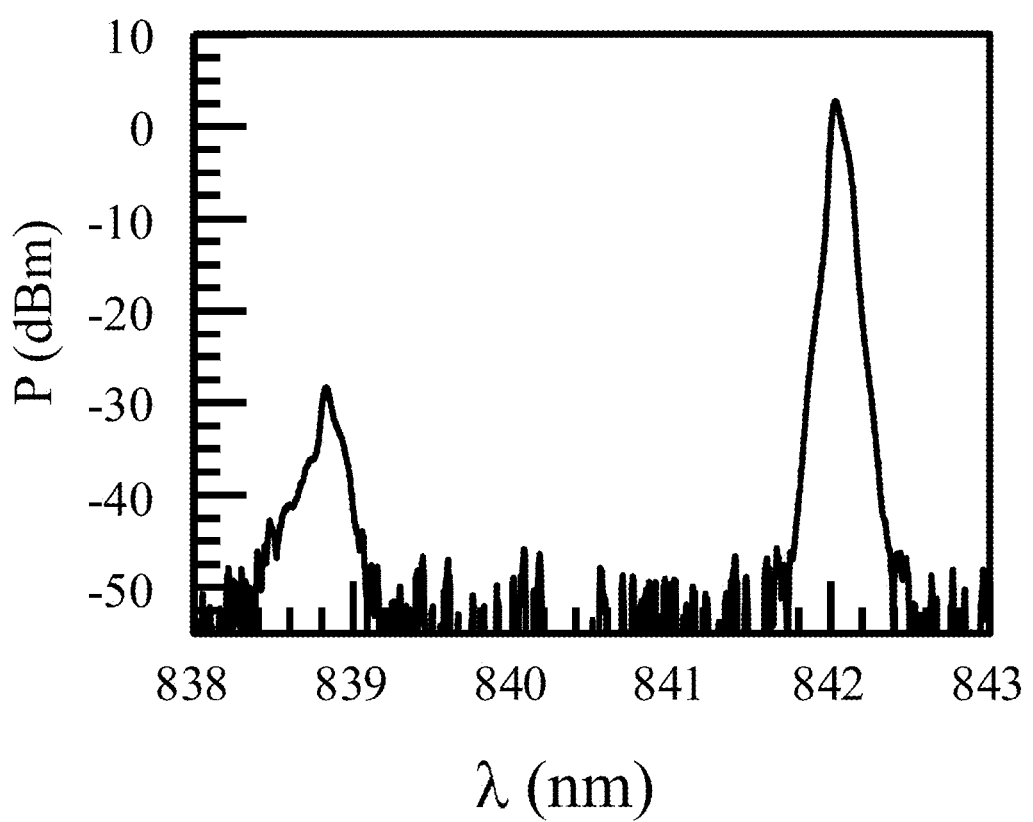
FIG. 7B is a plot of the optical signal power P(dBm) vs wavelength λ (nm) that shows the optical spectrum of the SM VCSEL after the light is coupled into the example fiber denoted "Fiber 1" in Table 3.

Data transmission experiments were also conducted using a SM VCSEL suitable for 25 Gb/s transmission. FIG. 7B is a plot of optical signal power P (dBm) vs wavelength $\lambda$ (nm) that shows the optical spectrum of the SM VCSEL after the light is coupled into the example "Fiber 1" fiber 6S. The primary mode is located near 842 nm. The second mode is located at wavelength near 839 nm and at a power level 30 dB below, essentially non-existing.

At the free space wavelength $\lambda$, the SM VCSEL has a total optical power of around 0.76 mW or −1.2 dBm. After the coupling into the example Fiber 1, with 2.7 V of DC driving voltage or about 3.5 mA driving current, the optical power output from the fiber is −3.6 dBm. An Agilent BERT system operating at 25 Gb/s was used for measuring bit error rate (BER). The controller (N4960A-CJ1) controls the pattern generator (N4951B) with 5-tap de-emphasis and error detector (N4952A-E32). The controller also provides a clock signal to the pattern generator. $2^7$-1 PRBS pattern is used across all experiments. The SM VCSEL was driven with 2.7 V DC voltage and 1.4 Vpp RF signal through a bias-T (SHF 122C).

Figure 8A:
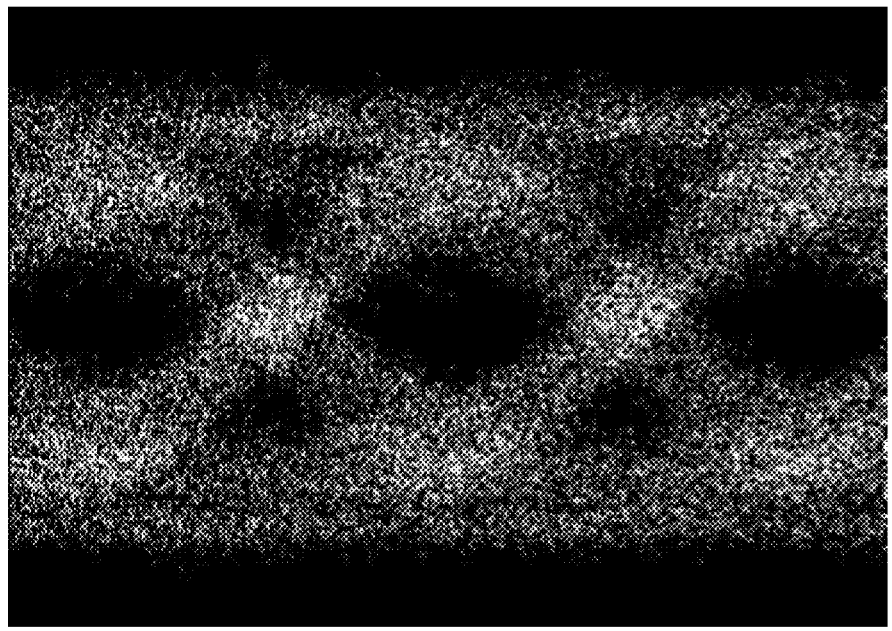
FIGS. 8A and 8B are eye diagrams of an SM VCSEL modulated at 25 Gb/s without de-emphasis and with the de-emphasis, respectively.
Figure 8B:
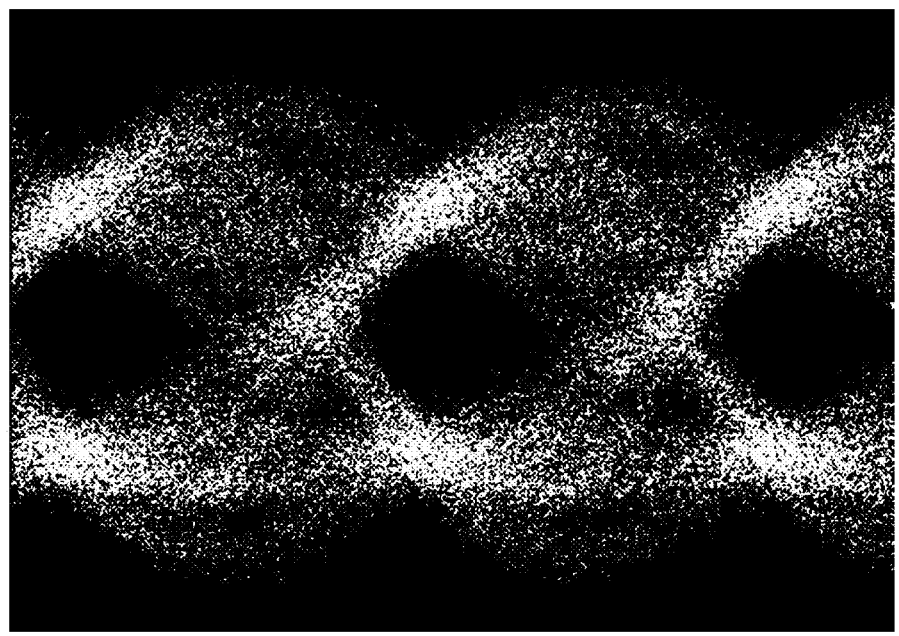

FIGS. 8A and 8B are eye diagrams without de-emphasis (FIG. 8A) and with de-emphasis (FIG. 8B) for an example SM VCSEL modulated at 25 Gb/s. To improve the opening of the eye diagram, the de-emphasis feature of the pattern generator was used to overcome the bandwidth limitation of the system. The first post cursor is set at the value of −0.43 using the system software.

Figure 8C:
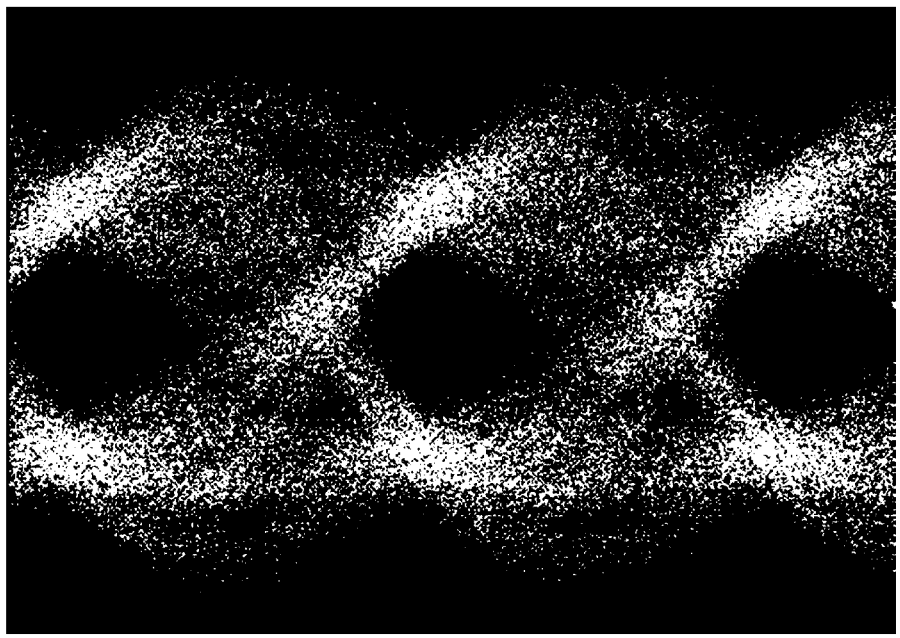
FIG. 8C is an eye diagram for the SM VCSEL modulated at 25 Gb/s and optically coupled to the example "Fiber 1" of Table 3, which has a gradient index profile and a 48.3 GHz·km OFL BW in a back-to-back (b-b) configuration.
Figure 8D:
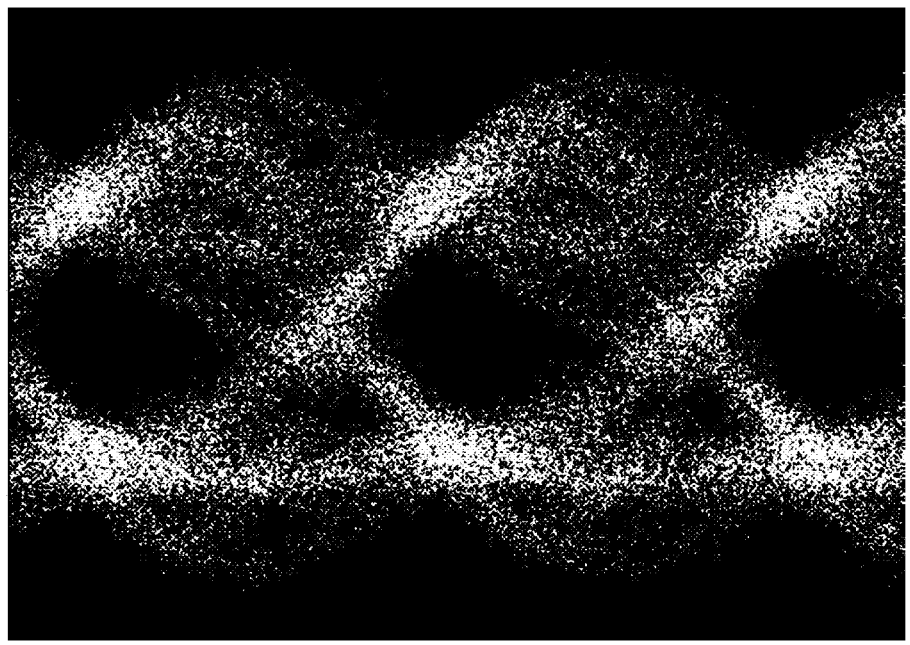
FIG. 8D is similar to FIG. 8C, but for a fiber length of 500 m.
Figure 8E:
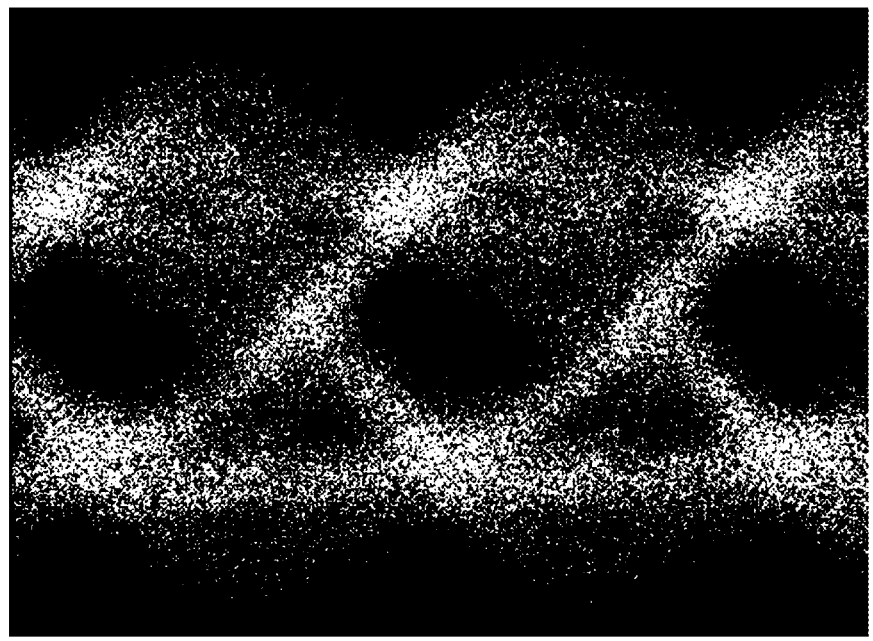
FIG. 8E is similar to FIG. 8D, but for a fiber length of 1000 m.
Figure 8F:
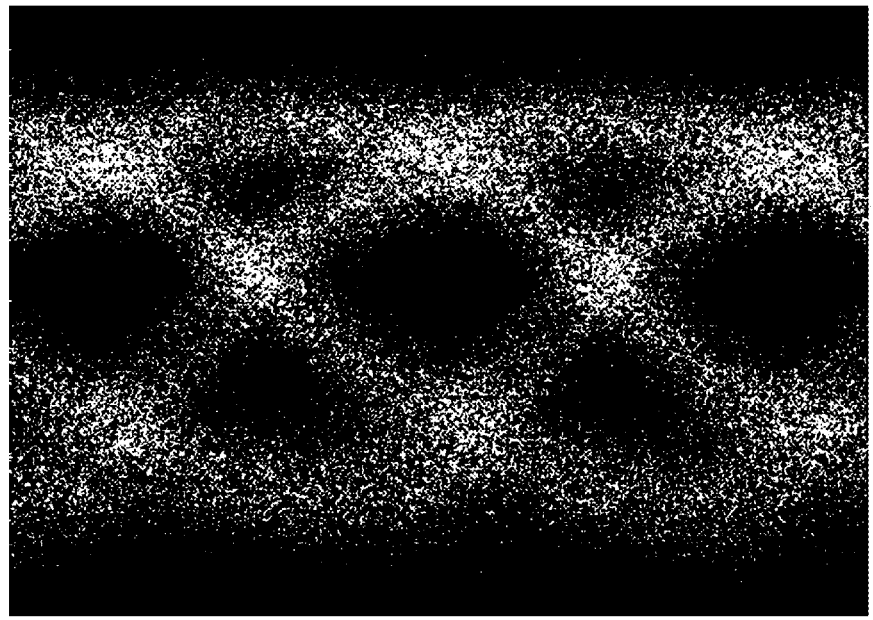
FIG. 8F is similar to FIGS. 8D and 8E, but for fiber length of 1500 m.
Figure 8G:
FIG. 8G is similar to FIG. 8D, but for a standard step-index fiber having a fiber length of 15 m.
Figure 8H:
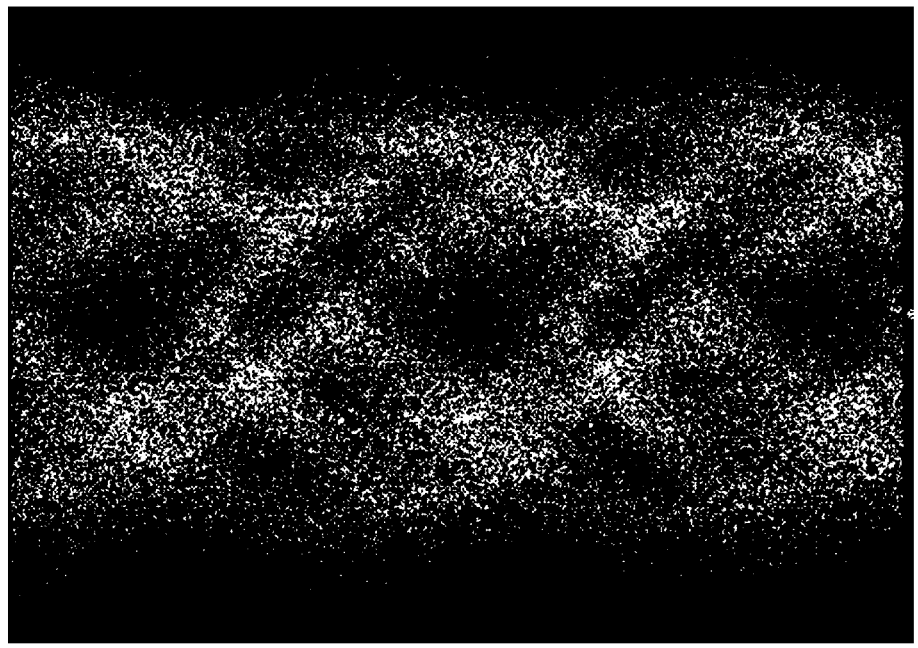
FIG. 8H is similar to FIG. 8G, but for a fiber length of 35 m, wherein the eye is noisy and closed, indicated unacceptable performance.

FIG. 8C is an eye diagram for the example SM VCSEL modulated at 25 Gb/s and optically coupled to the example "Fiber 1" of Table 3, which has a gradient index profile and a 48.3 GHz·km OFL BW in a back-to-back ("b-b") configuration. FIG. 8D is similar to FIG. 8C, but for a fiber length of 500 m. FIG. 8E is similar to FIG. 8D, but for a fiber length of 1000 m. FIG. 8F is similar to FIGS. 8D and 8E, but for fiber length of 1500 m. FIG. 8G is similar to FIG. 8D, but for a standard step-index fiber having a fiber length of 15 m. FIG. 8H is similar to FIG. 8G, but for a fiber length of 35 m, wherein the eye is noisy and closed, indicated unacceptable performance.

Transmission Performance of Example Fiber 1

The transmission performance of the example Fiber 1, which had a relatively high EMB BW of 48.3 GHz·km, was measured using a number of different configurations. Two sections of Fiber 1 were prepared in lengths of 500 m and 1000 m. The bit-error rate (BER) measurements were done at back-to-back (b-b) lengths of about 1 m, 500 m, 1000 m and 1500 m (1000 m+500 m). A variable optical attenuator was used to vary the level of optical attenuation to obtain the different curves in the plot of FIG. 9A of the BER vs. received optical power P (dBm) for the example transmission configurations indicated in the legend.

Figure 9A:
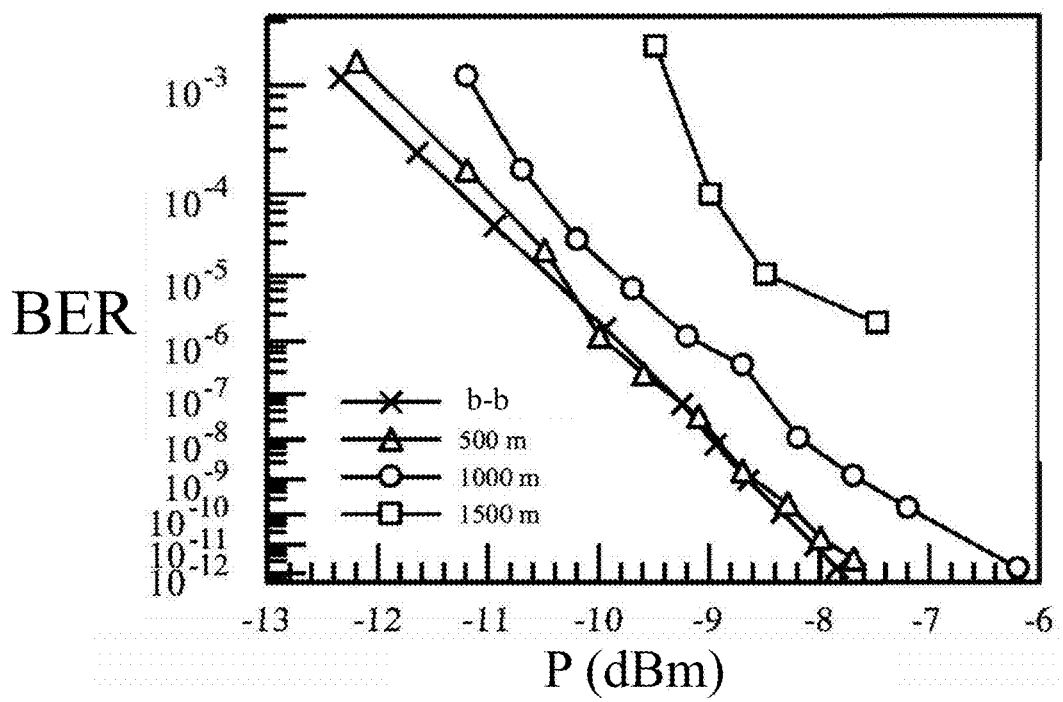
FIG. 9A is a plot of the bit error rate BER versus measured optical power P (dBm) for a number of different VCSEL/fiber configurations for the example fiber disclosed herein.

From the BER plot of FIG. 9A, in the back-to-back (b-b) configuration, the transmission system can reach error free performance at about −7.8 dBm. With the introduction of the 500 m section of Fiber 1, the system shows little power penalty. For the 1000 m section of Fiber 1, some power penalty was seen, but substantially error-free performance can be obtained. At the length of 1500 m, the system performance degrades significantly, but can still reach a BER of $2\times10^{-6}$, which is below the forward error correction threshold used for short distance optical communications.

Figure 9B:
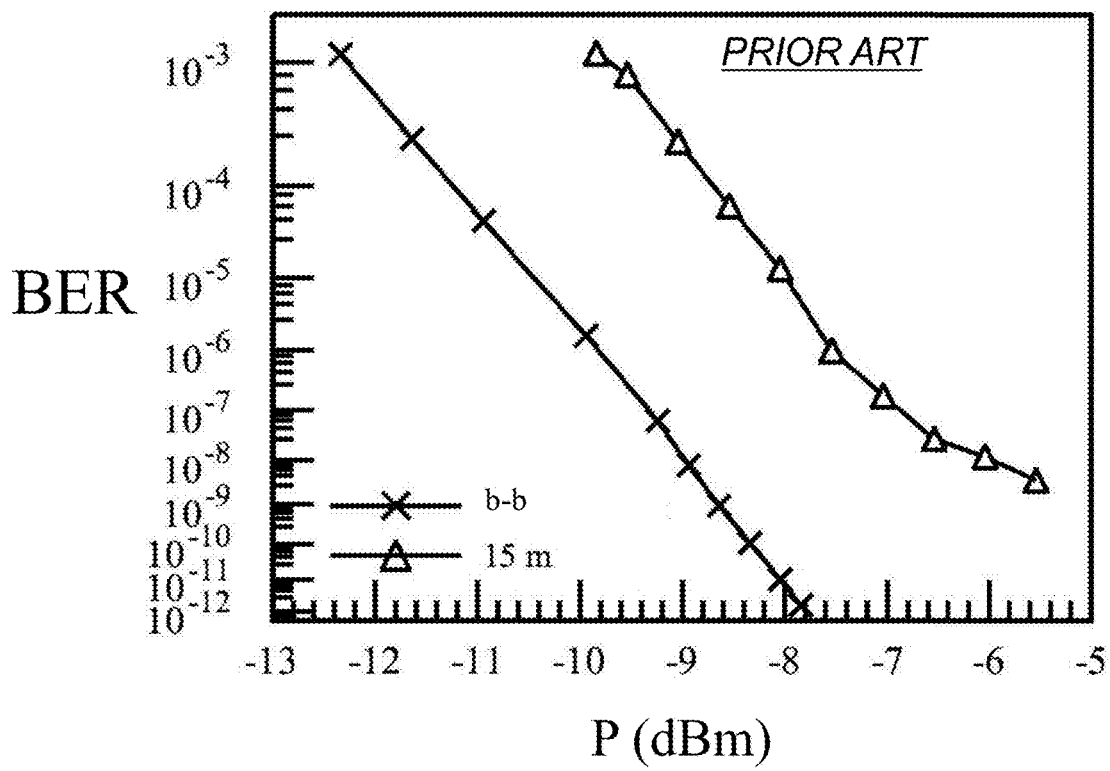
FIG. 9B is a BER plot similar to FIG. 9A but for a standard SM fiber.

It is of significant interest to compare the system performance of the graded index SM fiber with step index SM fiber. At 850 nm, the step index SM fiber has a much lower EMB BW of around 180 MHz·km. Two samples of step-index SM fiber of lengths of 15 m and 35 m where prepared. FIG. 9B is a plot of BER vs. received optical power P (dBm) for the back-to-back configuration and for the 15 m length. The BER plot of FIG. 9B shows that even for a 15 m length, the step index SM fiber has a substantial power penalty of greater than 2 dB for most of the data points compared to the back-to-back (b-b) case. In addition, even at such a short length, the system cannot achieve the error free performance. Furthermore, for the 35 m length, no meaningful data transmission is possible.

Example Data Transmission Systems

Figure 10A:
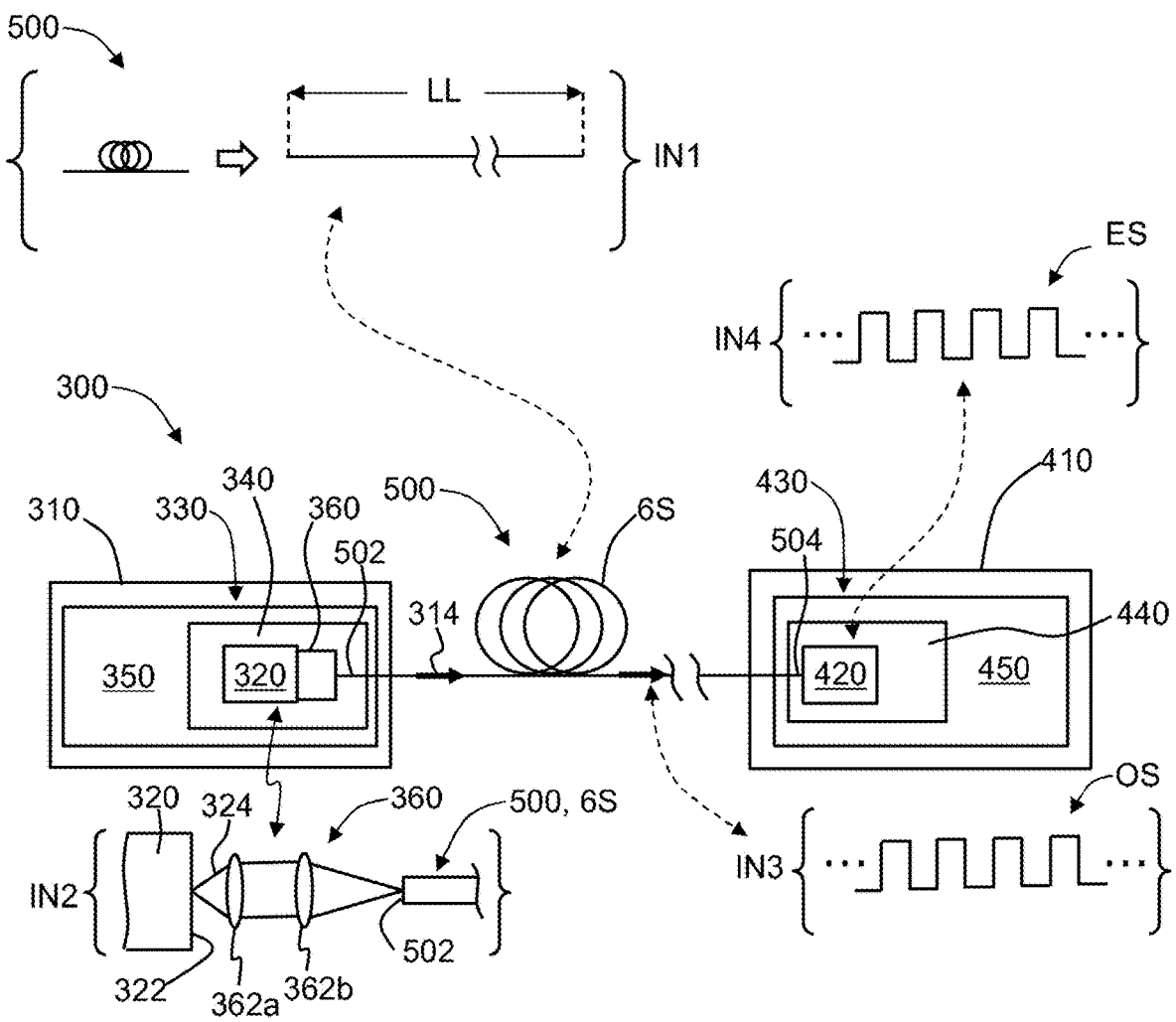
FIG. 10A is a schematic diagram of an example optical fiber data communications system that employs the single-core optical fiber disclosed herein to form the optical fiber link between a VCSEL-based transmitter and a receiver.

FIG. 10A is a schematic diagram of an example optical fiber data communications system ("system") 300 that comprises a transmitter 310 and a receiver 410 optically connected by an optical fiber link 500. The optical fiber link 500 comprises at least a section of the single core fiber 6S as disclosed herein. In an example, the optical fiber link 500 has an input end 502, an output end 504, and link length LL measured along the fiber(s) of the link between the input and output ends (see close-up inset IN1, which shows the optical fiber link 500 "unwound" to show the link length LL of the example systems disclosed herein). In an example, the link length is up to 1000 meters. In an example, the optical fiber link 500 can be constituted by a middle section constituted by a section of fiber 6S and input and output end sections constituted by relatively short jumper cables (e.g., a few meters long, at most). In an example, the jumper cables can also be made of the fiber 6S.

An example transmitter 310 includes a VCSEL 320 and a transmitter electronics unit 330 configured to operably support the operation of the VCSEL. In an example, the transmitter electronics unit 330 comprises a transmitter electronic integrated circuit (IC) 340 operably supported by a transmitter circuit board (e.g., a printed circuit board or PCB) 350. In an example, the transmitter electronic IC 340 is configured with a VCSEL driver and related electronic components (not shown) as known in the art.

With reference to the close-up inset IN2 of FIG. 10A, the VCSEL 320 has an output end 322 from which light 324 is emitted. In an example, the light 324 is optically coupled into the input end 502 of the optical link 500 (e.g., fiber 6S) using a coupling optical system 360. The example coupling optical system 360 comprises first and second lenses 362a and 362b, which in an example are aspherical lens elements. The close-up inset IN3 shows the light 324 comprising optical signals OS.

The receiver 410 comprises a photodetector 420 optically coupled to the output end 504 of the optical fiber link 500. The photodetector 420 is operably supported by a receiver electronics unit 430 configured to operably support the photodetector. In an example, the receiver electronics unit 430 comprises a receiver IC 440 operably supported by a receiver circuit board (e.g., a printed circuit board or PCB) 450. In an example, photodetector 420 is configured to convert the optical signals OS encoded on the light 324 into electrical signals ES (see the close-up inset IN4 in FIG. 10A), and the receiver IC 440 is configured to receive and process the electrical signals.

The system 300 is configured by virtue of the fiber 6S for SM optical transmission when the light 324 has a wavelength λ above 1260 nm and few mode optical transmission in the system 300 is compliant/compatible with the cutoff wavelength $\lambda_C$ and mode field diameter MFD of a standard SM fiber at 1310 nm and 1550 nm for SM operation and is optimized for bandwidth at a wavelength λ between 850 nm and 1060 nm for few mode transmission with SM or few mode VCSELs 320.

Figure 10B:
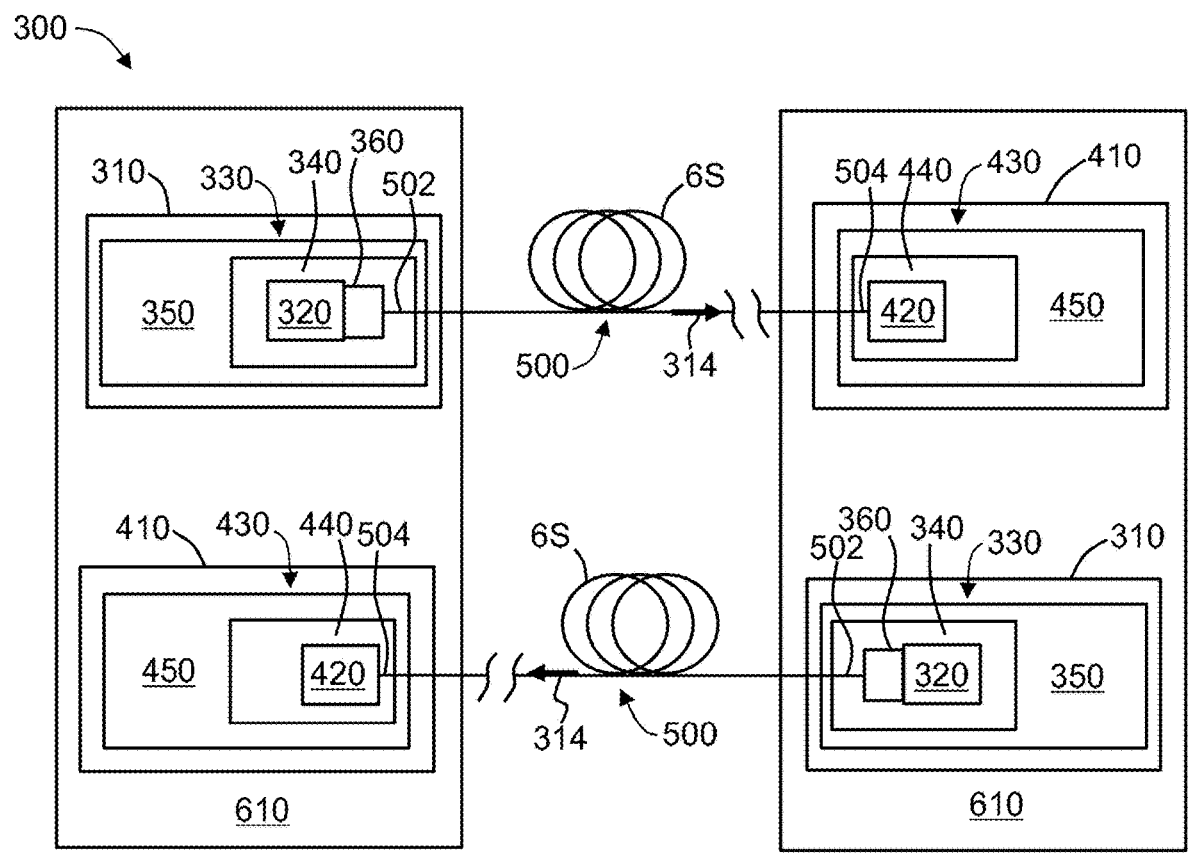
FIG. 10B is similar to FIG. 10A and illustrates an example optical fiber data communications system having two VCSEL-based transceivers.

FIG. 10B is similar to FIG. 10A and illustrates an example system 300 that includes two transceivers 610 in optical communication via two optical fiber links 500. Each transceiver 610 includes the transmitter 310 and the receiver 410. The system 300 provides two-way data communication between the optically coupled transceivers 610 via the two optical fiber links 500.

Figure 11A:
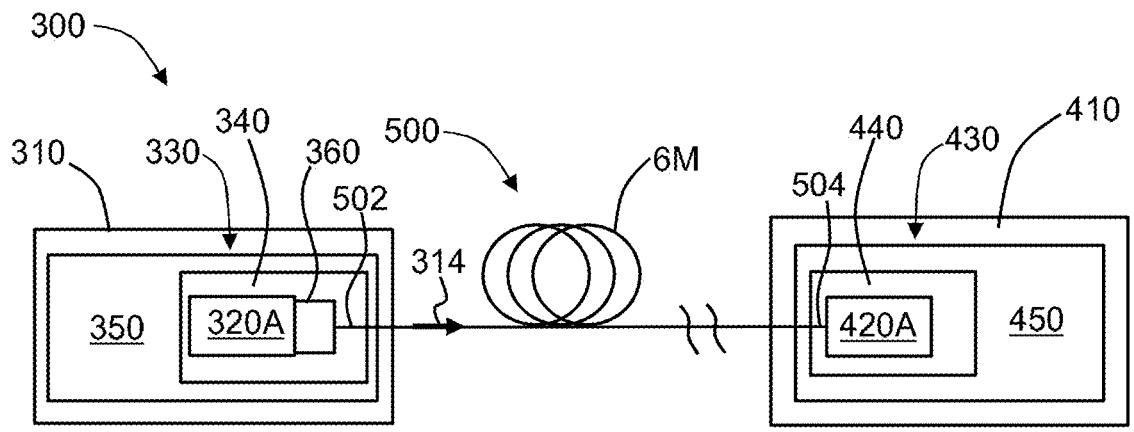
FIG. 11A is similar to FIG. 10A and illustrates an example optical fiber data communications system that employs the multicore optical fiber disclosed herein to form the optical fiber link between a VCSEL-based transmitter and a receiver.
Figure 11B:
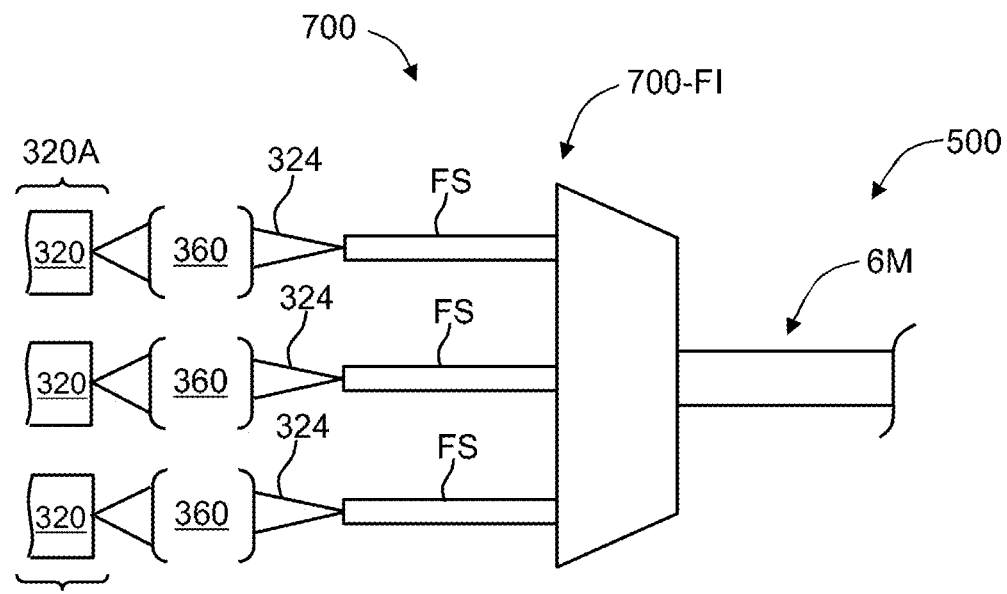
FIGS. 11B and 11C are close-up views of example optical coupling devices used to optically couple light from an array of VCSELs to the multicore optical fiber link (FIG. 11B) and to optically couple light from the multicore optical fiber link to the array of photodetectors (FIG. 11C).

FIG. 11A is similar to FIG. 10A and illustrates an embodiment of the system 300 wherein the optical fiber link 500 comprises at least a section of multicore fiber 6M as disclosed herein to define a multicore optical fiber link. The transmitter 310 now includes a VCSEL array 320A that has multiple VCSELs 320, as shown in the close-up view of FIG. 11B. In an example, the different VCSELs 320 in the VCSEL array emit light 324 having different wavelengths within a wavelength range from 800 nm and 1100 nm. In an example, the different wavelengths are spaced apart by at least several nm, and in an example at least 10 nm. In example, up to ten different wavelengths in a 100 nm range within the 800 nm to 1100 nm can be used.

The VCSEL array 320A is optically coupled to the multicore fiber 6M via an optical coupling device 700, such as a fan-in module 700-FI. In an example, the fan-in module 700 includes short fiber sections FS, which in an example can comprise sections of the single-core fiber 6S. The fan-in module 700-FI is configured to optically couple the light 324 from the VCSELs 320 into respective core structures 10M of the multicore fiber 10M of the multicore optical fiber link 500. The multicore optical fiber link 500 employing the multicore fiber 10M with n core structures 10M can carry n times more data than the optical fiber link 500 having only one single-core fiber 6S.

Figure 11C:
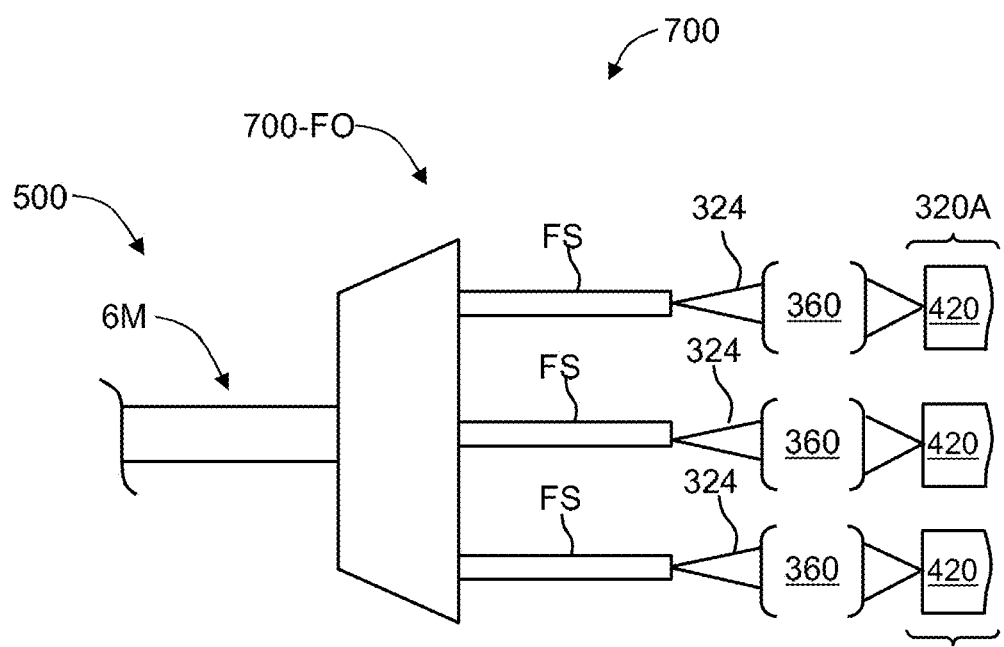

FIG. 11C shows an example fan-out module 700-FO used to optically couple the light 324 exiting the different core structures 10M of the multicore optical fiber link 500 to respective photodetectors 420 in an array of photodetectors 420A in the receiver 410.

Figure 11D:
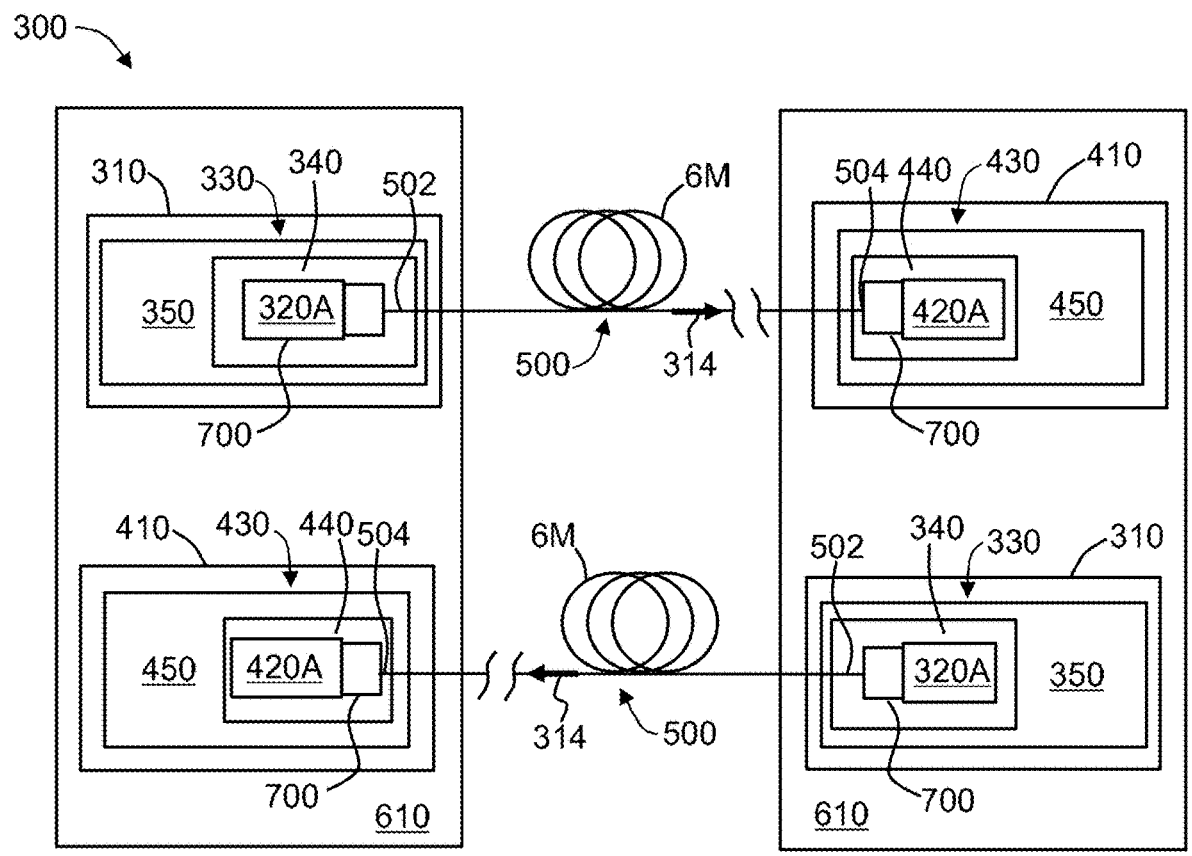
FIG. 11D is similar to FIG. 10B and illustrates an example optical fiber data communications system having two VCSEL-based transceivers in optical communication via two multicore optical fiber links.

FIG. 11D is similar to FIG. 11A and illustrates an example of the system 300 that utilizes two transceivers 610 each having a transmitter 310 with a VCSEL array 320A and a receiver 410 with a photodetector array 420A. Optical couplers 700 are operably disposed to place the core structures 10M of the multicore fibers 6M of the two multicore optical fiber links 500 in optical communication with the VCSEL array 320A and the photodetector array 420A.

The fiber 6S has a smaller core 10 than a standard MM fiber, but a larger core than a standard SM fiber, thereby allowing the fiber 6S to be used for SM and few mode communication of data signals over short distances, e.g., less than 1000 meters. It is known that the light 324 emitted by an SM VCSEL 320 can be focused to a relatively small focus spot for optical coupling into the fiber 6S. This focusing can be accomplished by the coupling optical system 360. The multicore fiber 6M has similarly sized core structures 10M for optically coupling to an SM VCSEL 320. A few-moded VCSEL 320 can also be used effectively at the wavelength where the fiber 6S or 6M supports a few modes. In an example that reflects the current state of the art, the example optical data communication systems 300 set forth above can be implemented for 25G duplex LC (Lucent Connector) connectivity using the form factor for standard SFP-28 SM optical fiber.

The systems 300 disclosed herein can be configured using at least one of the fibers 6S and/or 6M to meet a broad range of needs and data transmission applications. In general, the optical signals OS can be modulated using an NRZ modulation format, a PAM4 modulation format or other modulation format used in the art of high-data-rate signal transmission.

For example, for 100G transmission, most of short distance transmission is based on the QSFP28 form factor with 4X25G data streams transmitted in and out. The SM/FM VCSELs 320 can be packaged in a VCSEL array 320A to enable 4×25G transmission using a 25G NRZ modulation format or a 25G four-level pulse amplitude (PAM4).

In another example, the VCSEL 320 can be driven by 50G PAM4 electrical signals from the transmitter IC 320 just like a 100G bidirectional (BiDi) transceiver to achieve 100G transmission using two wavelengths, for example 850 nm and 900 nm.

In another example, different VCSELs 320 can be implemented to operate at different wavelengths to enable short wavelength division multiplexing (SWDM) transmission in the manner of conventional 100G SWDM transceivers. The transceivers can also be implemented to adopt the 400G transceiver form factor by using one or more of the base technology, such as 50G PAM4, parallel optics, SWDM to achieve 400G data rate per transceiver. The fiber and cable structure can be maintained the same as they are used for SM transmission so that the added function from graded-index fiber has broad compatibility.

Clauses of the Description

Clause 1 of the description discloses: An optical fiber for short-length data transmission systems, comprising: a) a core arranged along a centerline AC and having a gradient relative refractive index defined by an alpha parameter α in a range $2 \leq \alpha \leq 3$ with a maximum relative refractive index $\Delta_{1max}$ in the range $0.3\% \leq \Delta_{1max} \leq 0.5\%$ and a radius $r_1$ in the range $5\ \mu m \leq r_1 \leq 7\ \mu m$; b) an inner cladding region immediately surrounding the core and having a relative refractive index $\Delta_2$ in the range $-0.05\% \leq \Delta_2 \leq 0.05\%$ and a radius $r_2$ in the range from $6\ \mu m \leq r_2 \leq 15\ \mu m$; c) an intermediate cladding region immediately surrounding the inner cladding region and having a relative refractive index $\Delta_3 \leq \Delta_2$ and in the range $-0.6\% \leq \Delta_3 \leq -0.1\%$ and a radius $r_3$ in the range from $9\ \mu m \leq r_3 \leq 20\ \mu m$ and defining a trench volume V in the range $15\%\ \mu m^2 \leq |V| \leq 75\%\ \mu m^2$; d) an outer cladding region immediately surrounding the intermediate cladding region and having a relative refractive index $\Delta_4 \geq \Delta_3$ and in the range $0 \leq \Delta_4 \leq 0.2\%$ and a radius $r_4$ in the range from $40\ \mu m \leq r_4 \leq 100\ \mu m$; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from $8.6\ \mu m \leq MFD \leq 11\ \mu m$ at 1550 nm; and iii) an overfilled bandwidth OFL BW of at least 1 GHz·km at the at least one wavelength in the second wavelength range.

Clause 2 of the description discloses: The optical fiber according to Clause 1, wherein the overfilled bandwidth OFL BW is at least 2 GHz·km at the at least one wavelength in the second wavelength range.

Clause 3 of the description discloses: The optical fiber according to Clause 1, wherein the overfilled bandwidth OFL BW is at least 4 GHz·km at the at least one wavelength in the second wavelength range.

Clause 4 of the description discloses: The optical fiber according to Clause 1, wherein the overfilled bandwidth OFL BW is at least 7 GHz·km at the at least one wavelength in the second wavelength range.

Clause 5 of the description discloses: The optical fiber according to Clause 1, wherein the overfilled bandwidth OFL BW is at least 10 GHz·km at the at least one wavelength in the second wavelength range.

Clause 6 of the description discloses: The optical fiber according to Clause 1, wherein the overfilled bandwidth OFL BW is in the range from 1 GHz·km to 50 GHz·km at the at least one wavelength in the second wavelength range.

Clause 7 of the description discloses: The optical fiber according to any of Clauses 1-6, wherein the cable cutoff wavelength $\lambda_C$ is in the range from 1160 nm to 1260 nm.

Clause 8 of the description discloses: An optical fiber for short-length data transmission systems, comprising: a) a core arranged along a centerline AC and having a gradient relative refractive index defined by an alpha parameter α in a range $2 \leq \alpha \leq 3$ with a maximum relative refractive index $\Delta_{1max}$ in the range $0.3\% \leq \Delta_{1max} \leq 0.5\%$ and a radius $r_1$ in the range $5\ \mu m \leq r_1 \leq 10\ \mu m$; b) an inner cladding region immediately surrounding the core and having a relative refractive index $\Delta_2$ in the range $-0.5\% \leq \Delta_2 \leq 0.0\%$ and a radius $r_2$ in the range from $8\ \mu m \leq r_2 \leq 25\ \mu m$; c) an outer cladding region immediately surrounding the intermediate cladding region and having a relative refractive index $\Delta_4 \geq \Delta_3$ and in the range $0.0\% \leq \Delta_4 \leq 0.2\%$ and a radius $r_4$ in the range from $40\ \mu m \leq r_4 \leq 100\ \mu m$; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from $8.6\ \mu m \leq MFD \leq 11\ \mu m$ at 1550 nm; and iii) an overfilled bandwidth OFL BW in the range 1 GHz·km $\leq$ OFL BW $\leq$ 50 GHz·km at the at least one wavelength in the second wavelength range.

Clause 9 of the description discloses: The optical fiber according to Clause 8, wherein the overfilled bandwidth OFL BW is at least 2 GHz·km at the at least one wavelength in the second wavelength range.

Clause 10 of the description discloses: The optical fiber according to Clause 8, wherein the overfilled bandwidth OFL BW is at least 4 GHz·km at the at least one wavelength in the second wavelength range.

Clause 11 of the description discloses: The optical fiber according to Clause 8, wherein the overfilled bandwidth OFL BW is at least 7 GHz·km at the at least one wavelength in the second wavelength range.

Clause 12 of the description discloses: The optical fiber according to Clause 8, wherein the overfilled bandwidth OFL BW is at least 10 GHz·km at the at least one wavelength in the second wavelength range.

Clause 13 of the description discloses: The optical fiber according to Clause 8, wherein the overfilled bandwidth OFL BW is in the range from 1 GHz·km to 50 GHz·km at the at least one wavelength in the second wavelength range.

Clause 14 of the description discloses: The optical fiber according to any of Clauses 8-13, wherein the cable cutoff wavelength $\lambda_C$ is in the range from 1160 nm to 1260 nm.

Clause 15 of the description discloses: An optical fiber for short-length data transmission systems, comprising: a) a core arranged along a centerline AC and having a gradient relative refractive index defined by an alpha parameter α in a range $2 \leq \alpha \leq 3$ with a maximum relative refractive index $\Delta_{1max}$ in the range $0.35\% \leq \Delta_{1max} \leq 0.45\%$ and a radius $r_1$ in the range $5\ \mu m \leq r_1 \leq 7\ \mu m$; b) a cladding region immediately surrounding the core and having a relative refractive index $\Delta_4 \leq \Delta_1$ and in the range $-0.05\% \leq \Delta_4 \leq 0.05\%$ and a radius $r_4$ in the range from $40\ \mu m \leq r_4 \leq 100\ \mu m$; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from $8.6\ \mu m \leq MFD \leq 11\ \mu m$ at 1550 nm; and iii) an overfilled bandwidth OFL BW in the range 1

GHz·km≤OFL BW≤50 GHz·km at the at least one wavelength in the second wavelength range.

Clause 16 of the description discloses: The optical fiber according to Clause 15, wherein the overfilled bandwidth OFL BW is at least 2 GHz·km at the at least one wavelength in the second wavelength range.

Clause 17 of the description discloses: The optical fiber according to Clause 15, wherein the overfilled bandwidth OFL BW is at least 4 GHz·km at the at least one wavelength in the second wavelength range.

Clause 18 of the description discloses: The optical fiber according to Clause 15, wherein the overfilled bandwidth OFL BW is at least 7 GHz·km at the at least one wavelength in the second wavelength range.

Clause 19 of the description discloses: The optical fiber according to Clause 15, wherein the overfilled bandwidth OFL BW is at least 10 GHz·km at the at least one wavelength in the second wavelength range.

Clause 20 of the description discloses: The optical fiber according to Clause 15, wherein the overfilled bandwidth OFL BW is in the range from 1 GHz·km to 50 GHz·km at the at least one wavelength in the second wavelength range.

Clause 21 of the description discloses: The optical fiber according to any of Clauses 15-20, wherein the cable cutoff wavelength $\lambda_C$ is in the range from 1160 nm to 1260 nm.

Clause 22 of the description discloses: A multicore optical fiber for short-length data transmission systems, comprising: a cladding matrix; two or more core sections embedded within the cladding matrix, wherein each core section comprises: a) core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 µm≤$r_1$≤7 µm; b) an inner cladding region immediately surrounding the core and having a relative refractive index $\Delta_2$ in the range −0.05%≤$\Delta_2$≤0.05% and a radius $r_2$ in the range from 6 µm≤$r_2$≤15 µm; c) an intermediate cladding region immediately surrounding the inner cladding region and having a relative refractive index $\Delta_3$≤$\Delta_2$ and in the range −0.1%≤$\Delta_3$≤0.1% and a radius $r_3$ in the range from 9 µm≤$r_3$≤20 µm and defining a trench volume V in the range 15% µm²≤|V|≤75% µm²; and d) an outer cladding region defined by the cladding matrix and immediately surrounding the intermediate cladding region and having a relative refractive index $\Delta_4$≥$\Delta_3$ and in the range 0.0%≤$\Delta_4$≤0.2% and a radius $r_4$ in the range from 40 µm≤$r_4$≤100 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.6 µm≤MFD≤11 µm at 1550 nm; and iii) an overfilled bandwidth OFL BW of at least 1 GHz·km at the at least one wavelength in the second wavelength range.

Clause 23 of the description discloses: A multicore optical fiber for short-length data transmission systems, comprising: a cladding matrix; two or more core sections embedded within the cladding matrix, wherein each core section comprises: a) a core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 m≤$r_1$≤10 µm; b) an inner cladding region immediately surrounding the core and having a relative refractive index $\Delta_2$ in the range −0.5%≤$\Delta_2$≤0.0% and a radius $r_2$ in the range from 8 µm≤$r_2$≤25 µm; c) an outer cladding region defined by the cladding matrix and immediately surrounding the inner cladding region and having a relative refractive index $\Delta_4$≥$\Delta_3$ and in the range 0.0%≤$\Delta_4$≤0.2% and a radius $r_4$ in the range from 40 µm≤$r_4$≤100 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.6 µm≤MFD≤11 µm at 1550 nm; and iii) an overfilled bandwidth OFL BW in the range 1 GHz·km≤OFL BW≤50 GHz·km at the at least one wavelength in the second wavelength range.

Clause 24 of the description discloses: A multicore optical fiber for short-length data transmission systems, comprising: a cladding matrix; and two or more core sections embedded within the cladding matrix, wherein each core section comprises: a) a core arranged along a centerline AC and having a gradient relative refractive index defined by an alpha parameter α in a range 2≤α≤3 with a maximum relative refractive index $\Delta_{1max}$ n the range 0.35%≤$\Delta_{1max}$≤0.45% and a radius $r_1$ in the range 5 µm≤$r_1$≤7 µm; b) a cladding region defined by the cladding matrix and immediately surrounding the core and having a relative refractive index $\Delta_4$≤$\Delta_1$ and in the range −0.05%≤$\Delta_4$≤0.05%, and a radius $r_4$ in the range from 40 µm≤$r_4$≤100 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from 8.6 µm≤MFD≤11 µm at 1550 nm; and iii) an overfilled bandwidth OFL BW in the range 1 GHz·km≤OFL BW≤50 GHz·km at the at least one wavelength in the second wavelength range.

Clause 25 of the description discloses: An optical fiber data transmission system comprising: an optical fiber link comprising the optical fiber of any of Clauses 1-24, wherein the optical fiber link has an input end, an output end and a link length LL between the input and output ends, wherein LL<1000 meters; a transmitter comprising a VCSEL that emits light having a wavelength in the second wavelength range and that carries optical signals at a data rate of at least 10 Gb/s, wherein the VCSEL is optically coupled to the input end of the optical fiber link; and a receiver comprising a photodetector optically coupled to the output end of the optical fiber link and configured to receive the optical signals and convert the optical signals to electrical signals.

Clause 26 of the description discloses: The optical fiber data transmission system according to Clause 25, wherein the data rate is at least 25 Gb/s and wherein the link length LL≤500 m.

Clause 27 of the description discloses: The optical fiber data transmission system according to Clause 25, wherein the data rate is at least 50 Gb/s and wherein the link length LL≤300 m.

Clause 28 of the description discloses: The optical fiber data transmission system according to any of Clauses 25-27, wherein the optical signals are modulated using either a non-return-to-zero (NRZ) modulation format or a four-level pulse-amplitude modulation (PAM4) modulation format.

Clause 29 of the description discloses: A method of transmitting optical data, comprising: a) using a vertical cavity surface-emitting laser (VCSEL) to generating optical data signals at a data rate of at least 10 Gb/s; b) transmitting the optical data signals over an optical fiber link comprising an optical fiber according to any of Clauses 1-24; and c)

receiving the optical signals at a photodetector configured to convert the optical signals into electrical signals representative of the optical signals.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber for short-length data transmission systems, comprising:
   a) a core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 μm≤$r_1$≤7 μm;
   b) an inner cladding region immediately surrounding the core and having a relative refractive index $\Delta_2$ in the range −0.05%≤$\Delta_2$≤0.05% and a radius $r_2$ in the range from 6 μm≤$r_2$≤15 μm;
   c) an intermediate cladding region immediately surrounding the inner cladding region and having a relative refractive index $\Delta_3$≤$\Delta_2$ and in the range −0.6%≤$\Delta_3$≤−0.3% and a radius $r_3$ in the range from 9 μm≤$r_3$≤20 μm and defining a trench volume V in the range 15%μm$^2$≤|V|≤75%μm$^2$;
   d) an outer cladding region immediately surrounding the intermediate cladding region and having a relative refractive index $\Delta_4$≥$\Delta_3$ and in the range 0≤$\Delta_4$≤0.2% and a radius $r_4$ in the range from 40 μm≤$r_4$≤100 μm; and
   i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm;
   ii) a mode-field diameter MFD in the range from 8.6 μm≤MFD≤11 μm at 1550 nm; and
   iii) an overfilled bandwidth OFL BW of at least 1 GHz·km at at least one wavelength in the second wavelength range.

2. The optical fiber according to claim 1, wherein the overfilled bandwidth OFL BW is at least 2 GHz·km at the at least one wavelength in the second wavelength range.

3. The optical fiber according to claim 1, wherein the overfilled bandwidth OFL BW is at least 4 GHz·km at the at least one wavelength in the second wavelength range.

4. The optical fiber according to claim 1, wherein the overfilled bandwidth OFL BW is at least 7 GHz·km at the at least one wavelength in the second wavelength range.

5. The optical fiber according to claim 1, wherein the overfilled bandwidth OFL BW is at least 10 GHz·km at the at least one wavelength in the second wavelength range.

6. The optical fiber according to claim 1, wherein the overfilled bandwidth OFL BW is in the range from 1 GHz·km to 50 GHz·km at the at least one wavelength in the second wavelength range.

7. The optical fiber according to claim 1, wherein the cable cutoff wavelength $\lambda_C$ is in the range from 1160 nm to 1260 nm.

8. An optical fiber data transmission system comprising:
   an optical fiber link comprising the optical fiber of claim 1, wherein the optical fiber link has an input end, an output end and a link length LL between the input and output ends, wherein LL<1000 meters;
   a transmitter comprising a VCSEL that emits light having a wavelength in the second wavelength range and that carries optical signals at a data rate of at least 10 Gb/s, wherein the VCSEL is optically coupled to the input end of the optical fiber link; and
   a receiver comprising a photodetector optically coupled to the output end of the optical fiber link and configured to receive the optical signals and convert the optical signals to electrical signals.

9. An optical fiber for short-length data transmission systems, comprising:
   a) a core arranged along a centerline AC and having a gradient relative refractive index defined by an alpha parameter α in a range 2≤α≤3 with a maximum relative refractive index $\Delta_{1max}$ in the range 0.3%≤$\Delta_{1max}$≤0.5% and a radius $r_1$ in the range 5 μm≤$r_1$≤10 μm;
   b) an inner cladding region immediately surrounding the core and having a relative refractive index $\Delta_2$ in the range −0.5%≤$\Delta_2$≤0.0%, a trench volume V in the range 15% μm$^2$≤|V|≤75% μm$^2$, and a radius $r_2$ in the range from 8 μm≤$r_2$≤25 μm;
   c) an outer cladding region immediately surrounding the inner cladding region and having a relative refractive index $\Delta_4$≥$\Delta_2$ in the range 0.0%≤$\Delta_4$≤0.2% and a radius $r_4$ in the range from 40 μm≤$r_4$≤100 μm; and
   i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm;
   ii) a mode-field diameter MFD in the range from 8.6 μm≤MFD≤11 μm at 1550 nm; and
   iii) an overfilled bandwidth OFL BW in the range 1 GHz·km≤OFL BW≤50 GHz·km at at least one wavelength in the second wavelength range.

10. The optical fiber according to claim 9, wherein the overfilled bandwidth OFL BW is at least 2 GHz·km at the at least one wavelength in the second wavelength range.

11. The optical fiber according to claim 9, wherein the overfilled bandwidth OFL BW is at least 4 GHz·km at the at least one wavelength in the second wavelength range.

12. The optical fiber according to claim 9, wherein the overfilled bandwidth OFL BW is at least 7 GHz·km at the at least one wavelength in the second wavelength range.

13. The optical fiber according to claim 9, wherein the overfilled bandwidth OFL BW is at least 10 GHz·km at the at least one wavelength in the second wavelength range.

14. The optical fiber according to claim 9, wherein the cable cutoff wavelength $\lambda_C$ is in the range from 1160 nm to 1260 nm.

15. An optical fiber data transmission system comprising:
   an optical fiber link comprising the optical fiber of claim 9, wherein the optical fiber link has an input end, an output end and a link length LL between the input and output ends, wherein LL<1000 meters;
   a transmitter comprising a VCSEL that emits light having a wavelength in the second wavelength range and that carries optical signals at a data rate of at least 10 Gb/s, wherein the VCSEL is optically coupled to the input end of the optical fiber link; and
   a receiver comprising a photodetector optically coupled to the output end of the optical fiber link and configured to receive the optical signals and convert the optical signals to electrical signals.

16. The optical fiber data transmission system according to claim 15, wherein the data rate is at least 50 Gb/s and wherein the link length LL≤300 m.

17. A multicore optical fiber for short-length data transmission systems, comprising:

a cladding matrix;

two or more core sections embedded within the cladding matrix, wherein each core section comprises: a) core arranged along a centerline AC and having a gradient relative refractive index defined by an alpha parameter $\alpha$ in a range $2 \leq \alpha \leq 3$ with a maximum relative refractive index $\Delta_{1max}$ in the range $0.3\% \leq \Delta_{1max} \leq 0.5\%$ and a radius $r_1$ in the range $5 \; \mu m \leq r_1 \leq 7 \; \mu m$; b) an inner cladding region immediately surrounding the core and having a relative refractive index $\Delta_2$ in the range $-0.05\% \leq \Delta_2 \leq 0.05\%$ and a radius $r_2$ in the range from $6 \; \mu m \leq r_2 \leq 15 \; \mu m$; c) an intermediate cladding region immediately surrounding the inner cladding region and having a relative refractive index $\Delta_3 \leq \Delta_2$ and in the range $-0.6\% \leq \Delta_3 \leq 0.3\%$ and a radius $r_3$ in the range from $9 \; \mu m \leq r_3 \leq 20 \; \mu m$ and defining a trench volume V in the range $15\% \; \mu m^2 \leq |V| \leq 75\% \; \mu m^2$; and d) an outer cladding region defined by the cladding matrix and immediately surrounding the intermediate cladding region and having a relative refractive index $\Delta_4 \geq \Delta_3$ and in the range $0.0\% \leq \Delta_4 \leq 0.2\%$ and a radius $r_4$ in the range from $40 \; \mu m \leq r_4 \leq 100 \; \mu m$; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 840 nm and 1060 nm; ii) a mode-field diameter MFD in the range from $8.6 \; \mu m \leq MFD \leq 11 \; \mu m$ at 1550 nm; and iii) an overfilled bandwidth OFL BW of at least 1 GHz·km at at least one wavelength in the second wavelength range.

18. The optical fiber according to claim 17, wherein the overfilled bandwidth OFL BW is at least 4 GHz·km at the at least one wavelength in the second wavelength range.

19. The optical fiber according to claim 17, wherein the overfilled bandwidth OFL BW is at least 10 GHz·km at the at least one wavelength in the second wavelength range.

20. An optical fiber data transmission system comprising:

an optical fiber link comprising the multicore optical fiber of claim 17, wherein the optical fiber link has an input end, an output end and a link length LL between the input and output ends, wherein LL<1000 meters;

a transmitter comprising a VCSEL that emits light having a wavelength in the second wavelength range and that carries optical signals at a data rate of at least 10 Gb/s, wherein the VCSEL is optically coupled to the input end of the optical fiber link; and a receiver comprising a photodetector optically coupled to the output end of the optical fiber link and configured to receive the optical signals and convert the optical signals to electrical signals.

21. The optical fiber of claim 9, wherein the alpha parameter $\alpha$ is in a range $2.2 \leq \alpha \leq 2.6$.

* * * * *

UNITED STATES PATENT AND TRADEMARK OFFICE
CERTIFICATE OF CORRECTION

PATENT NO. : 11,099,321 B2  
APPLICATION NO. : 16/747179  
DATED : August 24, 2021  
INVENTOR(S) : Xin Chen et al.

Page 1 of 1

It is certified that error appears in the above-identified patent and that said Letters Patent is hereby corrected as shown below:

In the Claims

In Column 25, Line 42, Claim 1, delete "at at least" and insert -- at the at least --, therefor.

In Column 26, Line 34, Claim 9, delete "at at least" and insert -- at the at least --, therefor.

In Column 27, Line 17, Claim 17, delete "-0.6%≤$\Delta_3$≤0.3%" and insert -- -0.6%≤$\Delta_3$≤-0.3% --, therefor.

In Column 28, Line 4, Claim 17, delete "at at least" and insert -- at the at least --, therefor.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*